(12) United States Patent
Amick et al.

(10) Patent No.: US 11,154,057 B2
(45) Date of Patent: *Oct. 26, 2021

(54) USE OF NOOTKATONE TO TREAT MOSQUITO INFESTATIONS

(71) Applicant: EVOLVA SA, Reinach (CH)

(72) Inventors: Jean Amick, Lexington, KY (US); Ryan Murphy, Pewee Valley, KY (US)

(73) Assignee: EVOLVA SA

( * ) Notice: Subject to any disclaimer, the term of this patent is extended or adjusted under 35 U.S.C. 154(b) by 0 days.

This patent is subject to a terminal disclaimer.

(21) Appl. No.: 16/328,885

(22) PCT Filed: Sep. 1, 2017

(86) PCT No.: PCT/EP2017/072027
§ 371 (c)(1),
(2) Date: Feb. 27, 2019

(87) PCT Pub. No.: WO2018/042024
PCT Pub. Date: Mar. 8, 2018

(65) Prior Publication Data
US 2019/0208779 A1 Jul. 11, 2019

Related U.S. Application Data

(60) Provisional application No. 62/383,077, filed on Sep. 2, 2016.

(51) Int. Cl.
*A01N 35/06* (2006.01)
*A01N 25/04* (2006.01)
*A01N 25/30* (2006.01)

(52) U.S. Cl.
CPC .............. *A01N 35/06* (2013.01); *A01N 25/04* (2013.01); *A01N 25/30* (2013.01)

(58) Field of Classification Search
CPC ......... A01N 35/06; A01N 25/04; A01N 25/30
See application file for complete search history.

(56) References Cited

U.S. PATENT DOCUMENTS

| | | | |
|---|---|---|---|
| 4,800,196 A | 1/1989 | Nomura et al. | |
| 5,317,041 A | 5/1994 | Chapman et al. | |
| 5,847,226 A | 12/1998 | Muller et al. | |
| 5,916,917 A | 6/1999 | Suh et al. | |
| 6,107,341 A | 8/2000 | Hansen et al. | |
| 6,124,275 A | 9/2000 | Emerson | |
| 6,531,303 B1 | 3/2003 | Millis et al. | |
| 6,685,948 B1 | 2/2004 | Zeng et al. | |
| 6,689,593 B2 | 2/2004 | Millis et al. | |
| 6,808,717 B1 | 10/2004 | Bale | |
| 7,129,271 B2* | 10/2006 | Maupin .................. | C07C 49/21 514/475 |
| 7,442,785 B2 | 10/2008 | Chappell et al. | |
| 8,551,510 B2 | 10/2013 | Bedoukian | |
| 2004/0249219 A1 | 12/2004 | Saucy et al. | |
| 2005/0176818 A1 | 8/2005 | Maupin et al. | |
| 2005/0187289 A1 | 8/2005 | Dolan et al. | |
| 2007/0192986 A1 | 8/2007 | Garcia et al. | |
| 2010/0151519 A1 | 6/2010 | Julien et al. | |
| 2012/0246767 A1 | 9/2012 | Amick et al. | |
| 2015/0007368 A1 | 1/2015 | Saran et al. | |
| 2015/0250166 A1* | 9/2015 | Goldblum .............. | A01N 35/06 424/45 |
| 2019/0098897 A1 | 4/2019 | Amick et al. | |

FOREIGN PATENT DOCUMENTS

| | | |
|---|---|---|
| EP | 1 033 076 | 9/2000 |
| EP | 1083233 | 3/2001 |
| EP | 2537926 | 12/2012 |
| JP | H10-87409 | 4/1998 |
| WO | WO01/28343 | 4/2001 |
| WO | WO02/50053 | 6/2002 |
| WO | WO2010/126576 | 11/2010 |
| WO | 2014/031790 | 2/2014 |

OTHER PUBLICATIONS

The International Search Report (ISR) for PCT/EP2017/072027 dated Dec. 12, 2017, pp. 1-5.
Written Opinion of the International Searching Authority for PCT/EP2017/072027 dated Dec. 12, 2017, pp. 1-7.
Kadarohman, Asep et al. "Biolarvicidal of Vetiver Oil and Ethanol Extract of Vetiver Root Distillation Waste (*Vetiveria zizanoides*) Effectiveness toward *Aedes aegypti, Culex* sp., and *Anopheles sundaicus*" Journal of Essential Oil-Bearing Plants (2013) vol. 16(6), pp. 749-762.
McAllister, Janet C. et al. "Mode of Action for Natural Products Isolated From Essential Oils of Two Trees is Different From Available Mosquito Adulticides" Journal of Medical Entomology (2010) vol. 47(6), pp. 1123-1126.
Hamdan, Dalia I. et al. "Anti-inflammatory, insecticidal and antimicrobial activities and chemical composition of the essential oils of different plant organs from navel orange (*Citrus sinensis* (L.) Osbeck var. *Malesy*) grown in Egypt" Journal of Medicinal Plants Research (2013) vol. 7(18), pp. 1204-1215.
Chen, Xu Bo et al. "Essential Oil Composition and Larvicidal Activity of *Clinopodium gracile* (Benth) Matsum (Labiatae) Aerial Parts against the *Aedes albopictus* Mosquito" Tropical Journal of Pharmaceutical Research (2013) vol. 12(5), pp. 799-804.
Bomgardner, Melody "Nootkatone tested as a mosquito repellent" C&EN Global Enterprise (ACS Publication) (2016) vol. 94(14), p. 10.
"Flavor & Fragrance Compendium," Bedoukian Research, 169 pages https://search.bedoukian.com/ftavorfragrance/downloads/catalog_ff.pdf.

(Continued)

*Primary Examiner* — Shirley V Gembeh
(74) *Attorney, Agent, or Firm* — McDonnell Boehnen Hulbert & Berghoff LLP

(57) ABSTRACT

Compositions and methods for treating and preventing mosquito infestations are disclosed herein. Also disclosed herein are compositions and methods to reduce or prevent the spread of diseases for which mosquitoes may act as a vector.

12 Claims, 17 Drawing Sheets

(56) References Cited

OTHER PUBLICATIONS

"Orange oil" Wikipedia, Wikimedia Foundation, Nov. 29, 2019, https://en.wikipedia.org/w/index.php?title=Orange_oil&oldid=9284 74807.
Audrain et al.: "Allergy to oxidized limonene and linalool is frequent in the U.K", British Journal of Dermatology, vol. 171, No. 2 (2014).
Behle, Robert W., et al., "A Formulation to Encapsulate Nootkatone for Tick Control," Journal of Medical Entomology, 2011, vol. 48, Nr:6, pp. 1120-1127.
Chang, J. H. et al., "Effect of Application of Benzyl Benzoate on House Dust Mile Allergen Levels," Annals of Allergy, Asthma & Immunology, 1996, vol. 77, Nr:3, pp. 187-190.
Dancewicz, K., et al., "Deterrent activity of (+)-nootkatone and its derivatives towards the peach potato aphid (*Myzus persicae Sulzer*)," Progress in plant protection, 2012, vol. 52, Nr:5, pp. 221-225.
Dolan, Marc C., et al., "Ability of Two Natural Products, Nootkatone and Carvacrol, to Suppress Ixodes scapularis and Amblyomma americanum (Acari: Ixodidae) in a Lyme Disease Endemic Area of New Jersey," Journal of Economic Entomology, 2009, vol. 102, Nr:6, pp. 2316-2324.
Fishel, F., Using Your Handhed Lawn and Garden Sprayer, 2009, University of Florida Institute of Food and Agricultural Sciences, pp. 1-4 (2009).
Flor-Weiler, Lina B., et al., "Susceptibility of Four Tick Species, Amblyomma americanum, Dermacentor variabilis, xodes scapularis, and Rhipicephalus sanguineus (Acari: Ixodidae), to Nootkatone From Essential Oil of Grapefruit," Journal of Medical Entomology, 2011, vol. 48, Nr:2, pp. 322-326.
Gionfriddo et al. "Elimination of Furocoumarins in Bergamot Peel Oil," Perfumer & Flavorist, 29:48-52 (2004).
Karlberg et al., "Contact allergy to oxidized D-limonene among dermatitis patients", Contact Dermatitis, p. 201-206 (1997).
Letizia, C. S. et al., "Nootkatone," Food and Chemical Toxicology, vol. 38, Supplement 3, 2000, pp. s165-s167.
Maia et al. "Plant-based insect repellents: a review of their efficacy, development and testing," Malaria Journal 10: Suppl1-11 (2011).
Mao, L., et al. "Vetiver oil and nootkatone effects on the growth of pea and citrus," Industrial Crops and Products, 2006, vol. 23, Nr:3, pp. 327-332.
National Center for Biotechnology Information. PubChem Database. Limonene, CID=22311, https://pubchem.ncbi.nlm.nih.gov/compound/Limonene (accessed on Apr. 28, 2020).
Nootkatone Safety Data Sheet—Bedoukian Research 2015 at http://search.bedoukian.com/product_images/mxts/801_English_SDS_US.pdf (retrieved from the internet Dec. 29, 2019) May 20, 2015, p. 1-6.
Nootkatone Sigma-Aldrich Product No. 74437 at https://www.sigmaaldrich.com/catalog/product/aldrich/74437?lang=en&region=US&cm_sp=Insite-_-caContent_prodMerch_gruCrossEntropy-_-prod Merch 10-1) (Retrieved from the internet Jan. 21, 2021) (2021).
Takahashi et al., "Metabolic engineering of sesquiterpene metabolism in yeast," Biotechnol Bioeng. 97(1):170-81 (2007).
International Search Report and Written Opinion for Int. App. No. PCT/EP2017/057138, dated Jun. 13, 2017.
International Search Report and Written Opinion for Int. App. No. PCT/EP2017/057133, dated Jun. 14, 2017.
International Search Report and Written Opinion for Int. App. No. PCT/EP2017/057137, dated Jun. 14, 2017.
"Safety Assessment of Citrus Derived Peel Oils as Used in Cosmetics," Cosmetic Ingredient Review Expert Panel Final Report, Sep. 30, 2014: 1-31.
International Preliminary Report on Patentability for International Application No. PCT/EP2017/057124, dated Sep. 25, 2018.
Hartley et al., "DNA cloning using in vitro site-specific recombination," Genome Res. Nov. 2000;10(11):1788-95.
Kejlova et al., "Phototoxicity of bergamot oil assessed by in vitro techniques in combination with human patch tests." Toxicol In Vitro., 21 :1298-1303 (2007).
Limonene CASRN: 138-86-3; Toxnet Toxicology Data Network.
International Search Report and Written Opinion for Int. App. No. PCT/EP2017/057124, dated Jun. 27, 2017.

* cited by examiner

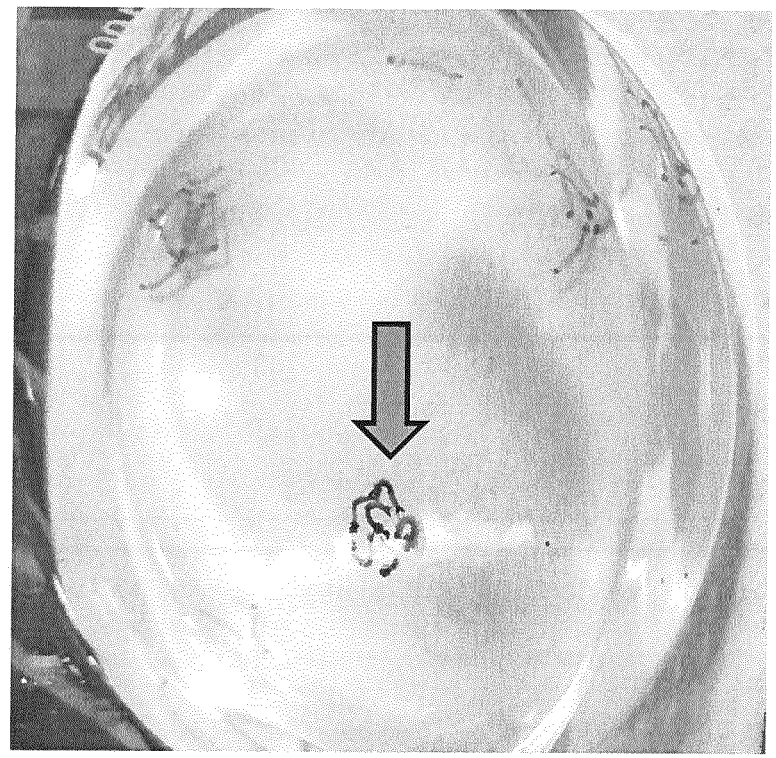
Figure 16C
Figure 16A
Figure 16B

USE OF NOOTKATONE TO TREAT MOSQUITO INFESTATIONS

CROSS-REFERENCE TO RELATED APPLICATIONS

This application is a national stage application under 35 U.S.C. § 371 of International Application No. PCT/EP2017/072027, filed Sep. 1, 2017, which claims the priority of U.S. Provisional Application No. 62/383,077, filed Sep. 2, 2016, the disclosures of each of which are explicitly incorporated by reference herein.

BACKGROUND OF THE INVENTION

Field of the Invention

This disclosure relates to the use of nootkatone-containing compositions to treat and prevent mosquito infestations by treating mosquito breeding sites.

Description of Related Art

*Aedes* species mosquitoes, including *Ae. aegypti* and *Ae. albopictus*, are known vectors for multiple human diseases, including those caused by dengue, chikungunya, and Zika viruses (i.e., arthropod-borne viruses or "arboviruses"). These diseases are prevalent in tropical climates, however, there are increasing numbers of reports of transmission into more temperate climates, including the continental United States, as *Aedes* species mosquitoes carrying these pathogens spread. Similarly, *Anopheles* mosquitoes that carry the *Plasmodium* parasite which causes malaria continue to pose an enormous health risk in tropical regions and sub-Saharan Africa. Indeed, WHO estimates that 214 million cases of malaria occurred worldwide in 2015 and over 400,000 people died from malaria.

Based on the dangers posed by mosquito-borne pathogens, reduction in the number of mosquito bites is a primary concern. A further concern is the introduction of pathogen-carrying mosquitoes into areas without these diseases. Moreover, non-pathogen carrying mosquitoes can become pathogen carriers by feeding on infected humans. Thus, as the prevalence of certain viral and other pathogen infections in humans increases, the chances of a non-pathogen carrying mosquito feeding on an infected person and becoming a pathogen carrier also increases. Therefore, while the prevention of mosquito bites among non-infected humans is important, it is equally important to prevent "rebiting" of infected individuals to halt the spread of these diseases.

Current approaches to prevent mosquito bites and associated diseases often focus on repelling and killing adult mosquitoes with chemical repellents and pesticides applied to individuals via sprays, etc. or that are broadcast environmentally via foggers, burning coils, etc. But while such repellent and pesticide compositions have some success with preventing mosquito bites, they have considerable limitations. For example, DEET (N,N-Diethyl-meta-toluamide) is effective at repelling mosquitoes when applied to an individual's skin or clothing, but DEET is perceived by many to have a strong "chemical" smell at the concentrations typically used, and this perception cannot be remedied by lowering the DEET concentration because of lost efficacy. As another example, permethrin is an insecticide used to combat mosquitoes. However, mosquitoes have reportedly begun developing resistance to permethrin. Moreover, the World Health Organization reports that malaria-carrying mosquitoes insecticide resistance is already widespread (*Malaria vector insecticide resistance: Compendium of national indicator definitions*, World Health Organization, August 2015, pages 1-20).

Other approaches to preventing mosquito bites include using electric bug zappers, ultrasonic repellents, sound imitators, and devices that combine chemical attractants and electric aspects to repel and/or kill mosquitoes. Yet these devices, too, have drawbacks. For example, to the extent to which they are effective, they are only effective within a limited area where they are in operation. Further, they require electricity from an electric outlet or batteries, which adds to cost and maintenance efforts.

Prior to becoming adults, mosquitoes pass through three life cycle stages: egg, larva, and pupa. Eggs, which are laid in a body of water, hatch to release larvae into the water, which mature into pupa. Pupa mature into adults, eclose and finally emerge from the water to complete the cycle. Mosquitoes are opportunists when it comes to choosing water sources where to lay their eggs. The water can be stagnant or fresh and may be an inland body of water (e.g., ponds, lakes, canals, creeks, ditches, irrigation channels, or marshy areas) or an object that creates a pool of water (e.g., cans, old tires, animal troughs, ornamental ponds, swimming pools, puddles, catch basins, paddling pools, rain barrels, gutters, or sewers).

Because the first three stages of the mosquito life cycle occur in water, methods to combat mosquitoes have also focused on killing larvae in the water with mixed success. One approach to killing larvae or preventing their maturation includes removing breeding sites (i.e., disposing of cans, old tires, etc.). But, many breeding sites are water sources that have an aesthetic value and others serve a functional purpose and thus removal is undesirable. For these breeding sites, mosquito larvae can be killed by treating the water with larvicides, such as certain oils, for example, soy oil or mineral oil, the spores or metabolites of *Bacillus thuringiensis israelensis*, and insect growth regulators, such as, methoprene. However, current larvicides have limited effectiveness against mosquito larvae, or raise concerns regarding animal and child safety or environmental impact.

Moreover, certain life-cycle stages may prove to be more prone than others to conventional treatments such as larvicides. Conversely, and problematically, it may also be possible for particular life cycle stages to be more protective than others against conventional treatments, as some life cycle stage serve to protect mosquitoes from harsh environmental conditions, such as drought (see Bick, "Resistance of *Culex quinquefasciatus* Say Larvae and Pupae to Experimental Drought," *Annals of the Entomological Society of America*, 41(3): 360-68, 1948). Therefore, there is a need for new compositions and methods that effectively control mosquito infestations in an efficient, safe, and environmentally friendly manner and that are effective against every mosquito life cycle stage.

SUMMARY OF THE INVENTION

Provided herein are effective natural compositions and methods of their use to treat and prevent larval-stage insect infestations.

In a first aspect, the invention provides a method of treating or preventing a mosquito infestation including applying an effective amount of a nootkatone-containing composition to a mosquito breeding site. In one embodiment of the first aspect, the nootkatone-containing composition reduces the rate of mosquito egg hatching in the mosquito breeding site. In another embodiment of the first aspect, the rate of mosquito egg hatching is reduced by at least about 30%. In one embodiment of the first aspect, one or more larvae that hatch from the eggs is killed. In a further embodiment of the first aspect, the application of the effective amount of the nootkatone-containing composition kills or prevents eclosion of pupae in the mosquito breeding site. In one embodiment of the first aspect, the application of the effective amount of the nootkatone-containing composition kills adults newly emerged from pupae in the mosquito breeding site. In another embodiment of the first aspect, application of the effective amount of the nootkatone-containing composition prevents female mosquitoes from laying eggs on the mosquito breeding site. In a particular embodiment of the first aspect, the female mosquitoes are repelled from landing on the mosquito breeding site. In a further particular embodiment of the first aspect, the female mosquitoes are killed upon landing on the mosquito breeding site. In one embodiment of the first aspect, the application of the effective amount of the nootkatone-containing composition prevents rebiting by the female mosquitoes.

In a second aspect, the invention provides a method of reducing a mosquito population includes treating a mosquito breeding site by applying an effective amount of a nootkatone-containing composition to the mosquito breeding site. Treating the mosquito breeding site with the effective amount of the nootkatone-containing composition kills at least two mosquito life cycle stage populations at the mosquito breeding site. In one embodiment of the second aspect, the nootkatone-containing composition is applied about once per day, about once every 3 days, about once per week, about twice per week, about once per two weeks, about once per month, about once per two months, or about once per three months, or about once per season. In another embodiment of the second aspect, the nootkatone-containing composition is applied using a dispenser. In a particular embodiment of the second aspect, the dispenser is a pouch, a puck, a pellet, a block, a granule, a vesicle, or a capsule. In a further particular embodiment of the second aspect, the dispenser is refillable.

In a third aspect, the invention provides a method for preventing the spread of at least one disease carried by mosquitoes includes treating a mosquito breeding site with a composition having an effective amount of nootkatone. In one embodiment of the third aspect, the method can further include killing a mosquito at the mosquito breeding site. In one embodiment of the third aspect, the mosquito is a member of the genera *Anopheles, Aedes, Culex,* or *Haemagogus*. In a particular embodiment of the third aspect, the mosquito is *Aedes aegypti*.

In a fourth aspect, the invention provides a method of reducing rebiting of mosquitoes includes treating a mosquito breeding site with an effective amount of a nootkatone-containing composition. Treatment of the mosquito breeding site at least one of repels or kills female mosquitoes.

In a fifth aspect, the invention provides a method of reducing a mosquito population including treating a mosquito breeding site with an effective amount of a composition comprising nootkatone and one or more of reducing oviposition, killing females attempting to oviposit, killing larvae, reducing eclosion, or reducing egg hatching of mosquitoes at the mosquito breeding site.

In one embodiment of the fifth aspect, the mosquito population includes at least one of a mosquito egg, a mosquito larva, a mosquito pupa, an eclosed mosquito, and an adult female mosquito.

In one embodiment according to any of the previous aspects or embodiments, the nootkatone is wholly or partially solubilised, liquefied, and/or dispersed in a composition prior to treating a mosquito breeding site. In one embodiment, the composition comprises one or more of ethanol, dichloromethane, ethyl acetate, hexane, an oil, a non-polar solvent, a surfactant, or a mixture or blend thereof. In another embodiment, the composition includes a non-toxic, biodegradable nootkatone-solubilizing carrier or surfactant or a mixture or blend thereof.

Other aspects, embodiments, and implementations will become apparent to those of ordinary skill in the art by reading the following detailed description, with reference where appropriate to the accompanying drawings.

DESCRIPTION OF DRAWINGS

FIGS. 16A and 16B show photographs of droplets of liquefied nootkatone of varying sizes on the water surface without larvae present;

FIG. 16C shows a photograph of dead larvae 24 hr after liquefied nootkatone treatment;

DETAILED DESCRIPTION

Figure 1:
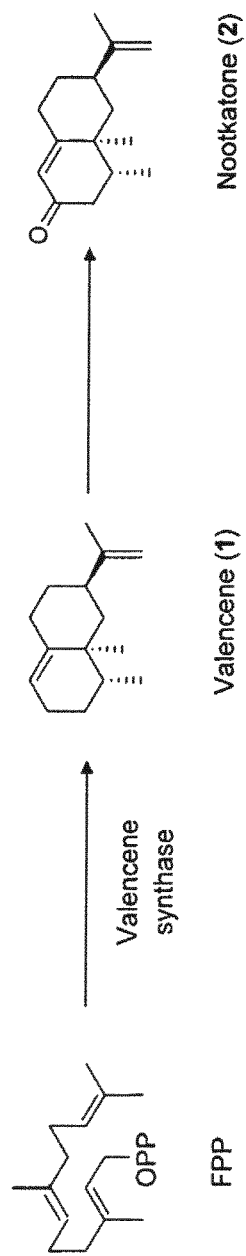
FIG. 1 illustrates a biosynthetic pathway for nootkatone.

All publications, patents and patent applications cited herein are hereby expressly incorporated by reference in their entirety for all purposes.

Before describing the present invention in detail, a number of terms will be defined. As used herein, the singular forms "a," "an," and "the" include plural referents unless the context clearly dictates otherwise. For example, reference to "an active ingredient" means one or more active ingredients.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that can or cannot be utilized in a particular embodiment of the present invention.

For the purposes of describing and defining the present invention it is noted that the term "substantially" is utilized herein to represent the inherent degree of uncertainty that can be attributed to any quantitative comparison, value, measurement, or other representation. The term "substantially" is also utilized herein to represent the degree by which a quantitative representation can vary from a stated reference without resulting in a change in the basic function of the subject matter at issue.

As used herein, the term "about" refers to ±10% of any particular value.

As used herein, the terms "or" and "and/or" are utilized to describe multiple components in combination or exclusive of one another. For example, "x, y, and/or z" can refer to "x" alone, "y" alone, "z" alone, "x, y, and z," "(x and y) or z," "x or (y and z)," or "x or y or z."

As used herein, the term "active ingredient" refers to a chemical compound or mixture of chemical compounds that kills, renders immobile, prevents progression into another stage of the life cycle, or repels mosquitoes from a treated surface during one or more life cycle stages.

As used herein, the term "life cycle stage" refers to the life cycle stages of mosquitoes including egg, larva, pupa, and adult and periods of transition between stages or eclosion.

As used herein, the term "life cycle stage population" refers to all members of any particular life cycle stage, such as all mosquito eggs, or all mosquito larvae, or all mosquito pupae, or all mosquito adults.

As used herein, the term "pathogen" refers to any disease causing substance or life-form (e.g., virus, arbovirus, Flavivirus, bacteria, fungus, parasite, or microbe).

As used herein, the term "mosquito" refers to any mosquito species. Non-exhaustive examples include members of the genera *Anopheles, Aedes, Culex*, and *Haemagogus*. Further, the term "mosquito" refers to mosquitoes in any life cycle stage.

As used herein, the term "mosquito breeding site" refers to a location where at least one of an adult female mosquito could lay eggs, or mosquito eggs could mature into larvae, or mosquito larvae could mature into pupae, or mosquito pupae could mature into adult mosquitoes that could emerge from and leave the location. Examples of mosquito breeding sites include standing water typically preferred by insects with waterborne larval stages including stagnant or fresh water sources, an inland body of water (e.g., ponds, lakes, canals, creeks, ditches, irrigation channels, or marshy areas), and objects that create a pool of water (e.g., cans, old tires, animal troughs, ornamental ponds, swimming pools, puddles, catch basins, paddling pools, rain barrels, gutters, or sewers—such small volume water sources as bottle caps and the like are similarly contemplated).

As used herein, the term "treatment of mosquitoes" or "treating mosquitoes" refers to a process by which a mosquito in any life cycle stage is at least one of contacted with a composition including an active ingredient, killed, repelled from a surface, prevented from laying eggs, or prevented from transitioning from one life cycle stage to the next. Further, treatment of mosquitoes may include contacting a mosquito breeding site with a composition including an active ingredient. In these contexts, treatment of mosquitoes may include any manner of treatment performed to reduce the population of a mosquito in any life cycle stage, for example, by preventing egg laying, preventing eclosion, killing a specific life cycle stage mosquito, preventing adult emergence from larvae, or killing newly emerged adults. Examples of treatments include applying to a surface a composition including nootkatone, applying a composition including a conventional larvicide, such as an oil, such soy oil or mineral oil, the spores or metabolites of *Bacillus thuringiensis israelensis*, or an insect growth regulator, such as, methoprene. Treatment of mosquito life cycle stages may include a second or subsequent treatment to prevent recovery of or maturation of a particular life cycle stage population.

As used herein, the term "infestation" refers to the introduction or presence of at least one mosquito in a given area. For example, a mosquito infestation occurs when one or more mosquitoes fly into an area, emerges from a mosquito breeding site into the area, or otherwise appears in the area. Contemplated areas include any indoor or outdoor area without limitation.

As used herein, the terms "surface" and "object to be treated" interchangeably refer to any mosquito, any mosquito breeding site, a surface area and/or material that mosquitoes may attempt to traverse or inhabit, or are surfaces and objects on which mosquitoes may be observed or could act as vectors for their transportation. Examples of surfaces include, without limitation, water surfaces (e.g., of ponds, lakes, canals, creeks, ditches, irrigation channels, or marshy areas), the edges of water bodies (e.g., shorelines, pool liners and/or covers, banks, etc.), and the surfaces of objects that can create a pool of water (e.g., animal troughs, ornamental ponds, swimming pools, catch basins, paddling pools, rain barrels, gutters, or any surface of equipment, or tools used in conjunction with any of the aforementioned objects.

As used herein, the term "effective concentration" refers to a concentration of an active ingredient (such as nootkatone) within a composition such that when the composition is applied to a mosquito or to a relevant surface, a mosquito that is contacted by the composition is repelled and/or experiences paralysis, poisoning, neuro-muscular damage, or death. An "effective concentration" is also one that prevents egg laying or transitioning from one life cycle stage to the next.

As used herein, the term "effectively treat" refers to at least one of directly (e.g., by contacting a mosquito or its immediate surroundings) or indirectly (e.g., by contacting a mosquito breeding site or other surface that a mosquito will be affected by) repelling, paralyzing, poisoning, damaging neuro-muscular tissue of, killing, preventing egg laying by or transitioning from one life cycle stage to the next, or preventing the maturation of a mosquito.

As used herein, the term "nootkatone" refers to a compound seen in FIG. 1 that may be synthesized, isolated, and purified from of a mixture of products produced in a host modified to express enzymes of the nootkatone biosynthetic pathway or that can be produced from naturally occurring sources, such as citrus plants. "Nootkatone" further refers to derivatives and analogs analogs thereof. For example, the nootkatone compound contemplated for use herein may be produced in vivo through expression of one or more enzymes involved in the nootkatone biosynthetic pathway in a recombinant yeast or in vitro using isolated, purified enzymes involved in the nootkatone biosynthetic pathway, such as those described in U.S. Patent Application Publication Nos. 2015/0007368 and 2012/0246767. Therefore, nootkatone as defined herein can differ chemically from other sources of nootkatone, such as extracts from plants and derivatives thereof, or may include such plant extracts and derivatives thereof.

Overview

Disclosed herein are nootkatone-containing compositions and methods that effectively treat and prevent mosquito infestations. More importantly, disclosed herein are compositions that for the first time show efficacy against each life cycle stage of the mosquito. In particular, compositions and methods that effectively treat mosquito larvae, eggs, newly emerging adults, egg-laying adults, pupae, and eclosure are disclosed.

In one embodiment, these compositions and methods of treatment reduce the spread of mosquito-transmitted diseases by reducing mosquito populations and the frequency of rebiting, where a mosquito has bitten a person or animal and subsequently bites a second human or animal potentially infecting the second human or animal. In one embodiment, the frequency of rebiting is reduced by preventing egg-carrying females from laying their eggs or killing egg laying females at nootkatone-treated breeding sites, thus preventing the mosquitoes from seeking a subsequent blood meal. As a result, the compositions and methods disclosed herein reduce the spread of mosquito-borne diseases.

More generally, it is highly desirable to treat mosquito breeding sites because this approach offers several advantages over other strategies for combatting mosquitoes. For example, smaller quantities of a treatment composition can be used because application is narrowed to only mosquito breeding sites. In addition, application of an active ingredient to a mosquito breeding site has the significant benefit of minimizing exposure of other insects.

Additionally, treating mosquito breeding sites has significant advantages not only in preventing or reducing the population of the next generation of mosquitoes, but also in treating the current adult mosquitoes as they endeavor to find a location suitable for laying eggs that will meet all the requirements of their hatched larvae. This aspect of the current invention is of particular value in preventing the spread or reducing the prevalence of pathogens transmitted by the adult mosquitoes. For example, after obtaining a blood meal, the female mosquito will rest for a few days (typically 2-3 days) while the blood is digested and her eggs develop. Once the eggs are fully developed, the female finds shallow water, lays the eggs and seeks another host to provide a blood meal required for the next set of eggs. This cycle of feeding and laying eggs repeats itself until the female dies (typically 1-2 weeks but possibly up to one month for many species). The mosquito may act as a vector for an arbovirus, such as a Flavivirus, by receiving the virus during a blood meal from an early host and transmitting it to a later host. In some aspects, the current invention breaks this "re-biting" cycle required for pathogen transmission by killing, incapacitating or repelling the egg-laying adult female as she attempts to lay eggs at a treated mosquito breeding site. By reducing the number of potential mosquito breeding sites available to females seeking to lay eggs by treating mosquito breeding sites with a nootkatone-containing composition, fewer mosquitoes are able to reproduce, and mosquito infestations in treatment areas subside.

In another aspect, the current disclosure provides methods and uses for a composition comprising nootkatone suitable for treating a surface, a mosquito breeding site, or an environment rich in mosquitoes for preventing or delaying the onset of maturation into adulthood.

Additional aspects of the current disclosure are intended to reduce or prevent the occurrence of disease transmission by mosquitoes. For example, disclosed herein are compositions and methods for preventing vector-borne pathogenic infections and include compositions capable of killing mosquitoes in one or more waterborne stages of their lifecycle.

In one embodiment, the use of nootkatone provides a sustainable and biodegradable alternative to current insect repellents and pesticides for combatting mosquito infestations in an efficient, safe, and environmentally friendly manner.

In some embodiments, compositions containing nootkatone may be administered alone to effectively treat mosquitoes. In other embodiments, nootkatone-containing compositions are used in combination with other insecticides or other treatments disclosed herein to effectively treat mosquitoes. For example, compositions including nootkatone may be administered in combination with or successively with the application of natural predators of mosquitoes. For example, natural predators of mosquitoes include dragonfly nymphs and frogs. Some pesticides used against mosquitoes are also effective in killing their natural predators, thus reducing the long term biological control available in the area in which pesticide has been applied. However, at lower concentrations, nootkatone is not believed to have such a broad specificity on common insects, fish, nymphs, and frogs.

In some embodiments, treatment for mosquitoes can be through administration of a contemplated composition to any part of a connected water system, such as a watershed, a tributary, an irrigation system, a sprinkler system, a pool, a water fountain, a drainage system (such as a gutter), an animal watering system, an aqueduct, or any other part of a water system that may serve as a larval-stage insect breeding site. Further, administration of contemplated compositions for effective treatment of mosquitoes can be within any part of a connected water system that is in fluid communication with the remainder of the connected water system to be treated, meaning that such application will result in an added treatment composition being distributed to the remainder of the connected water system.

In some embodiments, irrigation systems are contemplated that apply nootkatone-containing compositions during the process of watering plants. Examples of such irrigation systems include small systems, such as those used in private gardens and lawns and commercial systems used for commercial scale crop production facilities, such as farm fields and hydroponic facilities.

Compositions

Nootkatone-containing compositions contemplated herein can be formulated for direct application to a surface to effectively treat existing mosquito life cycle stage populations or as a prophylactic to prevent the growth or spreading of mosquitoes to new mosquito breeding site.

Generally and without limitation, compositions contemplated herein can be in the form of an aqueous liquid, an oil-based liquid, a concentrated liquid, a gel, a foam, an emulsion, a slurry, a paint, a clear coat, a wax, a block, a pellet, a puck, a dunk, a granule, a powder, a capsule, a vesicle, an effervescent tablet, slow release tablet, an impregnated dissolvable sheet or film, an impregnated material, and combinations thereof. Further compositions may be configured for immediate release, delayed release, intermittent release, or extended release by inclusion of excipients and/or packaging structures and/or materials that enable such release profiles.

In certain aspects, a composition may be formulated as a liquid or aerosol formulation suitable for application in a spray, a roll on, a dip, detergents, or a foam.

In certain aspects, a composition may be formulated for application by dispensing into or onto an area of a connected water system to be distributed throughout the system. In this context, the composition can be provided as a solution, an emulsion, an oil, a spray, a gel, a powder, a foam, a block, a pellet, a dunk, a puck, a composition-filled dissolvable pouch, a granule, a vesicle, a capsule, and combinations thereof.

In other embodiments of the invention, compositions contemplated herein can contain any effective amount of nootkatone. In another embodiment, compositions contemplated herein can contain a carrier and at least about 0.001%, or at least about 0.005%, or at least about 0.01%, or at least about 0.02%, or at least about 0.03%, or at least about 0.04%, or at least about 0.05%, or at least about 0.06%, or at least about 0.07%, or at least about 0.08%, or at least about 0.09%, or at least about 0.1%, or at least about 0.2%, or at least about 0.3%, or at least about 0.4%, or at least about 0.5%, or at least about 0.6%, or at least about 0.7%, or at least about 0.8%, or at least about 0.9%, or at least about 1%, or at least about 2%, or at least about 3%, or at least about 4%, or at least about 5%, or at least about 6%, or at least about 7%, or at least about 8%, or at least about 9%, or at least about 10%, or greater than about 10%, or greater than about 15%, or greater than about 20%, or greater than about 25%, or greater than about 30%, or greater than about 35%, or greater than about 40%, or greater than about 45%, or greater than about 50%, or about 60%, or about 70%, or about 80%, or about 90%, or about 95%, or about 99% by weight nootkatone.

In one example, the provided compositions contain nootkatone in an amount at or about 0.001% to at or about 2%, or about 0.01% to at or about 5%, or about 0.01% to at or about 75% by weight of the composition. In another example, a composition may contain nootkatone in an amount of from at or about 1% to at or about 50% by weight of the composition. In another example, a composition may contain nootkatone in an amount of from at or about 5% to at or about 40% by weight of the composition. In another example, a composition may contain nootkatone in an amount of from at or about 10% to at or about 30% by weight of the composition. In another example, a composition may contain nootkatone in an amount of from at or about 15% to at or about 25% by weight of the composition. In another example, a composition may contain nootkatone in an amount of from at or about 1% to at or about 90% by weight of the composition. In another example, a composition may contain nootkatone in an amount of about 10%, or about 15%, or about 20%, or about 25%, or about 30%, or about 50% by weight of the composition. In another example, a composition may contain nootkatone in an amount of up to about 99% or more by weight of the composition.

In one particular embodiment, a contemplated nootkatone-containing composition is provided as a concentrate. For example, a nootkatone-containing composition may be provided as a 20×, or a 10×, or a 5×, or a 3× concentrate that can be diluted by an end user with an appropriate solvent or by application to a connected water system or larval-stage insect breeding site to achieve a 1× (or other desired) working concentration. Alternatively, a nootkatone-containing composition may be provided to an end user at a 1× working concentration. However, any concentration is contemplated for use herein. For example, compositions provided as concentrates can be used without dilution at all or may be diluted from a highly concentrated concentrate (e.g., about 20× to about 100×, or about 30× to about 60×, or about 30×, or about 60×) to some multiple of concentration higher than 1×, such as 2×, 2.5×, 3×, etc. or can be used at a more dilute concentration, such as ½×, ¼×, ¹⁄₁₀×, etc.

In one embodiment, a final working concentration of nootkatone applied to a connected water system or other mosquito breeding site can be about 0.01% to about 0.03% or higher.

In one embodiment, a desired final working concentration of nootkatone applied to a connected water system or mosquito breeding site can be determined by calculating the relative surface area of the water system or breeding site, wherein the relative surface area refers to an air-liquid interface where a larval-stage insect would surface to breathe. For example, a final working concentration can be based on percent coverage of the relative surface area, the relative thickness of nootkatone at the air-surface interface over a relative surface area, or a combination of both. Specific final working concentration examples are about 5 mmol/m$^2$, or about 10 mmol/m$^2$, about 15 mmol/m$^2$, about 25 mmol/m$^2$, about 50 mmol/m$^2$, about 60 mmol/m$^2$, about 70 mmol/m$^2$, about 80 mmol/m$^2$, about 90 mmol/m$^2$, about 100 mmol/m$^2$, or higher.

In another embodiment, a contemplated composition may be seen in Table No. 1, where ingredients can be measured in percent volume per volume, percent weight per volume, or percent by weight.

TABLE NO. 1

Contemplated composition formulation.

| Ingredient | Approximate % |
|---|---|
| Nootkatone | 0.01-100 |
| Additional active ingredients | 0-99.9 |
| Carrier | 0-99.9 |
| Additives | 0-99.9 |

In certain embodiments, compositions contemplated herein may include nootkatone and one or more additional active ingredients. The one or more additional active ingredients may be effective against larval-stage insects. In another embodiment, a contemplated composition may include one or more active ingredients against a specific life cycle stage population, such as larval-stage insects, and one or more active ingredients against a different life cycle stage population, such as adult insects. In another embodiment, an additional active ingredient can have a different effective treatment profile than nootkatone (e.g., it may be life cycle stage population specific).

Additional active ingredients can include one or more biopesticides or biopesticide active ingredients, such as one or more of those registered with the United States Environmental Protective Agency. Additional active ingredients can also include attractants that lure larval-stage insect adults to lay eggs in a larval-stage insect breeding site that has been treated with a contemplated composition of the present disclosure. Further examples include pyrethroids, neem oil, natural plant extracts, soy oil, mineral oil, spores or metabolites of *Bacillus thuringiensis israelensis*, or an insect growth regulator, such as, methoprene, pyriproxyfen, or a modified triazine, such as, cyromazine, and combinations thereof.

Further examples of additional active ingredients include plant essential oil compounds or derivatives thereof. Examples include aldehyde C16 (pure), α-terpineol, amyl cinnamic aldehyde, amyl salicylate, anisic aldehyde, benzyl alcohol, benzyl acetate, cinnamaldehyde, cinnamic alcohol, carvacrol, carveol, citral, citronellal, citronellol, p-cymene, diethyl phthalate, dimethyl salicylate, dipropylene glycol, eucalyptol (cineole) eugenol, is-eugenol, galaxolide, geraniol, guaiacol, ionone, menthol, methyl salicylate, methyl anthranilate, methyl ionone, methyl salicylate, α-phelian-drene, pennyroyal oil perillaldehyde, 1- or 2-phenyl ethyl alcohol, 1- or 2-phenyl ethyl propionate, piperonal, piperonyl acetate, piperonyl alcohol, D-pulegone, terpinen-4-ol, terpinyl acetate, 4-tert butylcyclohexyl acetate, thyme oil, thymol, lavender oil, rosemary oil, peppermint oil, neem oil, clove extract, metabolites of trans-anethole, vanillin, and ethyl vanillin.

In another embodiment, a contemplated composition can include a nootkatone to additional active ingredient ratio of about 1:10, or about 1:8, or about 1:6, or about 1:4, or about 1:2, or about 1:1, or about 2:1, or about 4:1, or about 6:1, or about 8:1, or about 10:1.

In a further example, nootkatone-containing compositions can also include an additional active ingredient effective for repelling or killing other non-larval-stage insects or pests.

In other embodiments, compositions contemplated herein can include nootkatone in combination with one or more additives, such as a fragrance, a preservative, a propellant, a pH buffering agent, a UV blocker, a pigment, a dye, a surfactant, an emulsifier, a solvent, a salt, an acid, a base, an emollient, a sugar, and combinations thereof. Additional additives include disinfectants, larval-stage insect attractants or chemical lures and detergents. Contemplated disinfectants include quaternary ammonium compounds, phenol-based antimicrobial agents, and botanical oils with disinfectant properties.

In other embodiments, nootkatone-containing compositions can include a carrier, such as an aqueous liquid carrier, water, a saline, a gel, an inert powder, a zeolite, a cellulosic material, a microcapsule, an alcohol such as ethanol, a hydrocarbon, a polymer, a wax, a fat, an oil, a protein, a carbohydrate, and combinations thereof. Some carriers include time release materials where a nootkatone-containing composition may be released over a period of hours, or days, or weeks. Other contemplated carriers include those that wholy or partially solubilize and/or liquefy nootkatone within a nootkatone-containing composition, such that the nootkatone forms a contiguous, unbroken, or substantially unbroken film on a liquid surface to which the nootkatone-containing composition is added. Some examples of such carriers include ethanol, dichloromethane, ethyl acetate, hexane, oils, non-polar solvents, and the like. In one particular embodiment, non-toxic, biodegradable solubilizing carriers are contemplated. In a further embodiment, a carrier can be a liquid carrier combined with a surfactant capable of dispersing the nootkatone throughout the liquid carrier. In one embodiment, carriers and/or surfactants are contemplated that can solubilize nootkatone at temperatures of about 4° C. and greater. In one embodiment, carriers and/or surfactants are contemplated that can solubilize nootkatone at temperatures of about 10° C. and greater. In one embodiment, carriers and/or surfactants are contemplated that can solubilize nootkatone at temperatures of about 14° C. and greater.

Carriers may be added to a composition in an amount of about 10%, or about 15%, or about 20%, or about 25%, or about 30%, or about 50% by weight of the composition. In some applications, a carrier can be present in an amount that is at or greater than about 60%, about 70%, about 80%, about 90%, about 95%, or about 99% by weight of the composition. In another embodiment, a carrier can be included in an amount up that when added to the amount of nootkatone included in the composition amounts to 100% by volume.

Methods

According to some aspects of the current invention, nootkatone-containing compositions can be directly applied to mosquitoes and mosquito breeding sites. According to other aspects of the current invention, nootkatone-containing compositions may be applied to any mosquito, a connected water system, any mosquito breeding site, a portion of a mosquito breeding site, a surface area and/or material that mosquitoes may attempt to traverse or inhabit during any stage of their life cycle, or surfaces and objects on which mosquitoes may be observed or that could act as vectors for their transportation. Examples of such surfaces include, without limitation, water surfaces (e.g., of ponds, lakes, canals, creeks, ditches, irrigation channels, or marshy areas), the edges of water bodies (e.g., shorelines, pool liners and/or covers, banks, etc.), and the surfaces of objects that can create a pool of water (e.g., animal troughs, ornamental ponds, swimming pools, catch basins, paddling pools, rain barrels, gutters, or any surface of equipment, or tool used in conjunction with any of the aforementioned objects.

Treatment for mosquito infestation may be routine or prophylactic based on changing environmental conditions (such as raised humidity or temperature), seasonal changes (such as transitions from spring to summer to fall to winter to spring), observation of mosquito larvae, or in response to large numbers of adult mosquitoes. In some embodiments, contemplated methods include treatment with a composition including nootkatone may be performed at a temperature between 0 and 50° C., or during a season of high breeding activity of mosquitoes. Alternatively or in addition, contemplated methods include application of nootkatone-containing compositions to connected water systems or mosquito breeding sites prior to freezing during winter, so that water in these environments are pre-treated for the following season at the time of thawing.

According to some aspects of the current invention, nootkatone-containing compositions may be applied to a surface or mosquito breeding site once the temperature of said surface or mosquito breed site reaches a temperature range suitable for the hatching from eggs and survival of larval stage insects. For example, according to some aspects of the current invention treating mosquito and prevention of spread of mosquito born viruses, a first treatment of nootkatone-containing composition may be applied once the water temperature of a body of water suitable for acting as a habitat for mosquito larvae reaches greater than 16° C., greater than 17° C., greater than 18° C., or greater than 19° C. The minimum water temperature required to sustain the larval stage of mosquito life cycle varies with the specific species of mosquito.

According to some aspects of the current invention, nootkatone-containing compositions may be applied about once per day, about once every 3 days, about once per week, about twice per week, about once per two weeks, about once per month, about once per two months, or about once per three months, or about once per season.

According to some aspects of the current invention, nootkatone-containing compositions may be applied with a frequency calculated such that if a first treatment is applied to the same surface or mosquito breeding site, a second treatment may be applied to the same surface or mosquito breeding site before the end of the adult stage as counted from the day before the first treatment was applied. In this manner, the first treatment is effective against larvae and/or pupae present at that time, and the second treatment is effective against larvae resulting from eggs laid by mature mosquitoes of the last generation immediately prior to the first treatment that would have been in adult form during the first treatment. If any stage of the insect life cycle is shorter than the adult stage, several treatments may be applied until the maximum time for adult stage has passed. For example, when a first application of nootkatone-containing compositions is applied to a surface or mosquito breeding site on d=0, a second application of nootkatone-containing compositions may be applied at d=15, 15 days later to treat any larvae newly hatched from eggs laid by mosquitoes that were adults when the first nootkatone-containing compositions were applied. Optionally, additional treatments of nootkatone-containing composition may be applied to the surface or mosquito breeding site approximately every subsequent 15 days (e.g., d=30, d=45, d=60) and so on until the maximum adult life of the insect that emerged from a pupa the day before treatment (d=−1) has expired.

A non-limiting example of an effective method of treating a mosquito population and/or preventing spread of a virus, such as a Flavivirus carried by an *Aedes* mosquito, is to apply a nootkatone-containing composition to a body of surface water once the water temperature reaches a minimum temperature required to sustain the larval stage of that mosquito species, and the treatment is repeated approximately every total duration of the specific mosquito species' life cycle spent water-borne (such as, for example, every 15 days) to prevent any larvae and/or pupae progressing into adult mosquitoes from the treated water, said treatment repeated throughout the typical duration of the mature air-borne mosquito life cycle (such as, for example, the next 60 days). Thus a non-limiting example of an effective method of treating an *Aedes* mosquito population and/or preventing spread of a Flavivirus carried by an *Aedes* mosquito.

In some aspects, the repetition of the treatment may continue beyond the timeline of the adult life stage to prevent insects from untreated mosquito breeding sites laying eggs in the previously treated mosquito breeding site. This aspect is preferable when there are multiple mosquito breeding sites, at least one inaccessible mosquito breeding site, and/or some difficult to treat mosquito breeding sites.

Various methods according to some aspects of the current invention may be employed to contact mosquitoes, surfaces, and environments rich in mosquitoes with nootkatone-containing compositions.

Nootkatone can be applied, such as by directly pouring the composition into the water or placing a composition dispenser within a connected water system or mosquito breeding site such that the surface or environment to be treated comes into contact with the nootkatone at an effective concentration of, for example, between 100 and 2,000 ppm, preferably between 200 and 400 ppm, most preferably approximately 300 ppm. The applied nootkatone-containing composition can be left without active removal to degrade naturally.

In contrast to many active agents against insects in the art, nootkatone is able in some compositions of the current invention to form a film on the surface of water. Without wishing to be bound by theory, it is believed that the results disclosed herein indicate that the mechanism of action for killing larval-stage insects in water is tied, at least in part, to the fact that nootkatone floats on the surface of the water in a thin layer. Mosquito larvae, for example, must approach the surface of the water to breathe, but when they come into contact with the nootkatone they are killed, repelled, or immobilized to the extent that may drown. The nootkatone layer eventually evaporates from the surface of the water and prevents accumulation of nootkatone in a stagnant water system. Further, if the nootkatone enters running water unsuitable for mosquito larvae, the inherent movement of the water increases evaporation rates.

Dispensers/Applicators

In some embodiments, dispensers or applicators for dispensing or applying a composition contemplated herein are intended to be reused. For example, upon dispensing a nootkatone-containing composition, the dispenser or applicator can be refilled. In other embodiments, a dispenser or applicator is a single-use device or substance that functions as a nootkatone composition carrier that is, itself, dispensed or degraded. For example, a dispenser or applicator can be a dissolvable vehicle such as a pouch, a puck, a pellet, a block, a granule, a vesicle, or a capsule that contains at least one additional substance (i.e., carrier) that contributes to at least one of the structure of the dispenser or application or a controlled release of the nootkatone from the dispenser or applicator.

Topical compositions are also contemplated herein that may be dispensed using a dispenser or applicator including one or more of a spray bottle, a brush, a dropper, a sponge, a soft-tipped marking device with reservoir, pressurized dispenser, an aerosol can, a roll on bottle, a wipe, a tissue, and other devices suitable for application to surfaces, objects, or mosquito-rich environments.

In one embodiment, compositions contemplated herein may be applied to one or more surfaces using an applicator having a reservoir for carrying a composition in a wet form and/or a dry form. Examples of applicators that may be used include an aerosol container with a spray nozzle with or without a spray straw to focus delivery of the composition, a spray gun, an impregnated sheet, film, and/or matrix where the composition is released onto the surface by a releasing agent, such as water or other carrier. Additional examples include a pump sprayer, a trigger sprayer, or a pressurized spraying device. The composition may alternatively be applied by spraying or dispersing over at least a portion of an area susceptible to infestation by mosquitoes, including but not limited to spraying from a tractor, boat, irrigation spray, helicopter, crop duster or airplane.

In a further embodiment, methods for treating connected water systems and mosquito breeding grounds may include utilization of nootkatone-containing composition dispensers that release a contemplated composition into a body of water (treatment locale) over a period of time of minutes, hours, days, or weeks. Contemplated dispensers include floating dispensers that float and dispense at the surface of a body of water. For example, contemplated floating dispensers include those that are used for chlorine dispensing in swimming pools. Floating dispensers may float on the surface of a locale either freely or may be anchored. Further, when anchored, floating dispensers may float subsurface at a predetermined and adjustable depth.

Other dispensers include sink-floats that may be immersed within a treatment area and sink to or near the bottom of a treatment locale until such time as the treatment composition is completely released, at which time the dispenser floats to the surface to be recharged. In another embodiment, a weighted and buoyed dispenser may be used that includes a weighted composition dispenser connected to a floating buoy that suspends the dispenser at a predetermined depth at which depth the composition is dispensed.

In another embodiment, it is contemplated that a "use up cue" may be included in the contemplated dispensers, such as, for example, a beacon that gives off light and/or sound or changes color when a treatment composition has been nearly or completely used up. The use up cue may be based on a timer, in that, after a predetermined length of time that coincides with the time when the treatment composition is nearly or fully dispensed, the use up cue is triggered by the timer.

In the context of the sink float, the use up cue may function based on the rate of solubility of the treatment composition, such that when the treatment composition is fully dissolved, the weight loss from the sink float causes the float to rise to the surface. Alternatively, the use up cue of the sink float may be based on the rate of solubility of a companion substance within the sink float that dissolves at a rate corresponding to the rate of dispensing of the treatment composition.

In a further embodiment, a dispensor for use at the edge of a body of water may be in the form of a spike or similar device that can be driven into the bed of the body of water or at the edge of the body of water. The nootkatone composition within the device can then leach out into the body of water to effectively treat any present mosquito and prevent further infestation of the connected water system or mosquito breeding site.

Another aspect of the current invention includes pretreatment of surfaces, objects, environments prone to infestation with mosquitoes. This may be accomplished by coating the surfaces or objects with compositions that resist removal from the surface and contain an amount of a nootkatone, such as a paint, a clear coat, a wax, an oil, an adhesive, a resin, a cleaning solution, and combinations thereof. Another approach includes lining the surfaces, objects, environments prone to infestation with mosquitoes with one or more nootkatone-impregnated materials, such as thermoplastic or thermoset sheets impregnated with nootkatone.

A further treatment approach is to construct surfaces or objects with nootkatone-impregnated or nootkatone-coated materials, such as plastics, wood, cloth, textiles, composites, or porous materials to prevent infestation of connected water systems and other areas where mosquitoes may breed. The approaches disclosed herein can be used alone or in any combination.

EXAMPLES

The Examples that follow are illustrative of specific embodiments of the invention, and various uses thereof. They are set forth for explanatory purposes only and are not taken as limiting the invention. In particular, the examples demonstrate the effectiveness of nootkatone-containing compositions against each mosquito life cycle stage population.

Example No. 1: Susceptibility of Mosquito Larvae to Treatment with Nootkatone Formulations This example describes a laboratory bioassay in which groups of mosquito larvae were exposed to a nootkatone-containing composition to determine larval susceptibility to nootkatone.

The organisms used for testing are shown in Table No. 2 below.

TABLE NO. 2

Organisms used for testing.

| Name | Scientific name | Life stage/sex |
|---|---|---|
| Yellow fever mosquito | *Aedes aegypti* | 3rd/4th instar larvae/mixed sex |

TABLE NO. 2-continued

| Organisms used for testing. | | |
|---|---|---|
| Name | Scientific name | Life stage/sex |
| Malaria mosquito | *Anopheles quadrimaculatus* | 3rd/4th instar larvae/mixed sex |

Treatment

One milliliter of a solution of nootkatone in ethanol was applied directly to 100 milliliters of water containing larvae, using a micropipette. One treatment condition used 3% (v/v) nootkatone in ethanol, and a second treatment condition used 1% (v/v) nootkatone in ethanol, for final concentrations of 0.03% or 0.01% (v/v), respectively. One milliliter of pure ethanol was used as a control. Four replicates of 25 larvae were tested per treatment. Clean, glass 600 mL laboratory beakers were used as test containers such that the surface area of the water to be treated was 54 $cm^2$.

Assessments

Larvae were observed after 24 hours post-introduction to the test containers. The larvae were scored according to the following criteria:

Morbidity (M): does not swim to/from the water surface to feed and breathe or otherwise initiate directional movement, but still exhibits movement with or without tactile stimulation; or Dead (mortality): exhibits no movement, even with tactile stimulation.

Readings were discontinued if treated mortality reached 100%, or control mortality exceeded 20%.

Results

Figure 2:
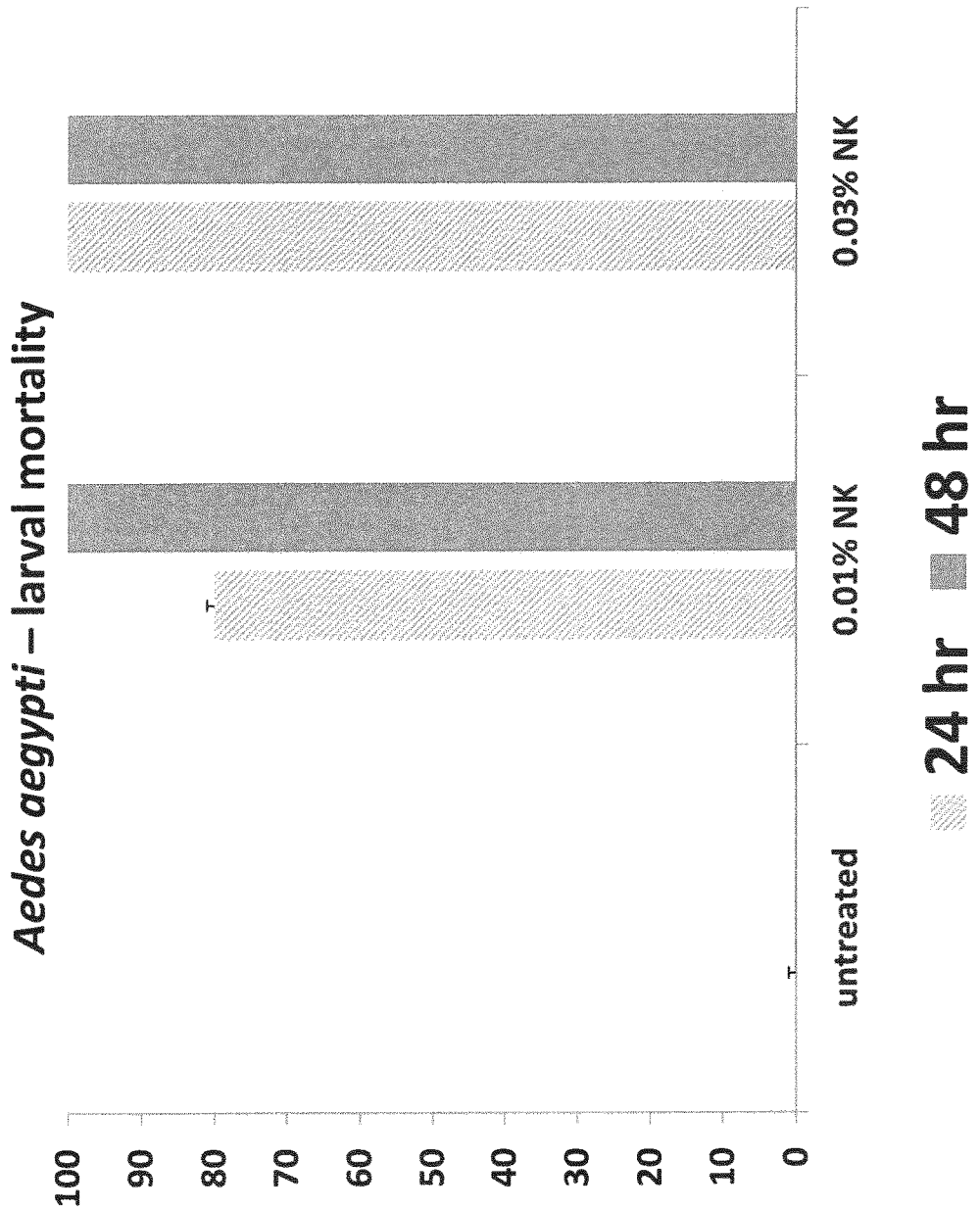
FIG. 2 shows the results of treating *Aedes aegypti* larvae with 0.01% and 0.03% nootkatone (v/v) in uncovered beakers compared to an ethanol control. Results were measured after 24 and 48 hr.

The results for 0.03% nootkatone treatment are shown in Table No. 3 below, and complete results are shown in FIG. 2.

Table No. 3. Effects of Nootkatone Treatment on mosquito larvae.

TABLE NO. 3

| Effects of Nootkatone Treatment on mosquito larvae. | | | | | | |
|---|---|---|---|---|---|---|
| Time post introduction | Means | | | Standard Error | | |
| | M | Dead | Affected | M | Dead | Affected |
| *Aedes aegypti* Larvae Untreated | | | | | | |
| 24 hours | 0 | 0 | 0 | 0.0 | 0.0 | 0.0 |
| 0.03% (v/v) Nootkatone | | | | | | |
| 24 hours | 0 | 100.0 | 100.0 | 0.0 | 0.0 | 0.0 |

None of the control larvae that were exposed to 1% ethanol were affected after 24 hours. In the four replicates that were exposed to 0.03% nootkatone (final concentration, v/v), at the end of 24 hours of exposure, 100% were killed, on average. In the four replicates that were exposed to 0.01% nootkatone (final concentration, v/v), at the end of 24 hours of exposure, 80% were killed, on average, but mortality rose to 100% after 48 hours.

The test results indicate very high mortality rates for mosquito larvae exposed to low concentrations of nootkatone compared to control after 24 hours of exposure. Therefore, mosquito larvae are highly susceptible to low concentrations of nootkatone, and nootkatone-containing compositions can effectively treat and prevent mosquito larvae infestations.

Example No. 2: Susceptibility of Mosquito Larvae to Treatment with Formulations that Contain Oils without Nootkatone This example describes a laboratory bioassay in which groups of mosquito larvae were exposed to compositions that contain oils, but not nootkatone, to determine whether larval mortality was due to suffocation by oils in general, or due to a specific property of nootkatone.

The organisms used for testing were mosquito larvae, as shown in Table No. 2 above.

Treatment

One milliliter of a solution of oil in ethanol was applied directly to 100 milliliters of water containing larvae, using a micropipette. One treatment condition used 3% (v/v) soybean oil in ethanol, and a second treatment condition used 3% (v/v) mineral oil in ethanol, for final concentrations of 0.03% (v/v), respectively. One milliliter of pure ethanol was used as a control, and 0.03% (v/v) nootkatone in ethanol was included as a comparison of efficacy. Two replicates of 25 larvae were tested per treatment in clean, glass 600 mL beakers.

Assessments

Larvae were observed at +24, +48, and +72 hours post-introduction to the test containers. At each observation period, larvae were scored according to the following criteria:

Morbidity (M): does not swim to/from the water surface to feed and breathe or otherwise initiate directional movement, but still exhibits movement with or without tactile stimulation; or Dead (mortality): exhibits no movement, even with tactile stimulation.

Readings were discontinued if treated mortality reached 100%, or control mortality exceeded 20%.

Results

Figure 3:
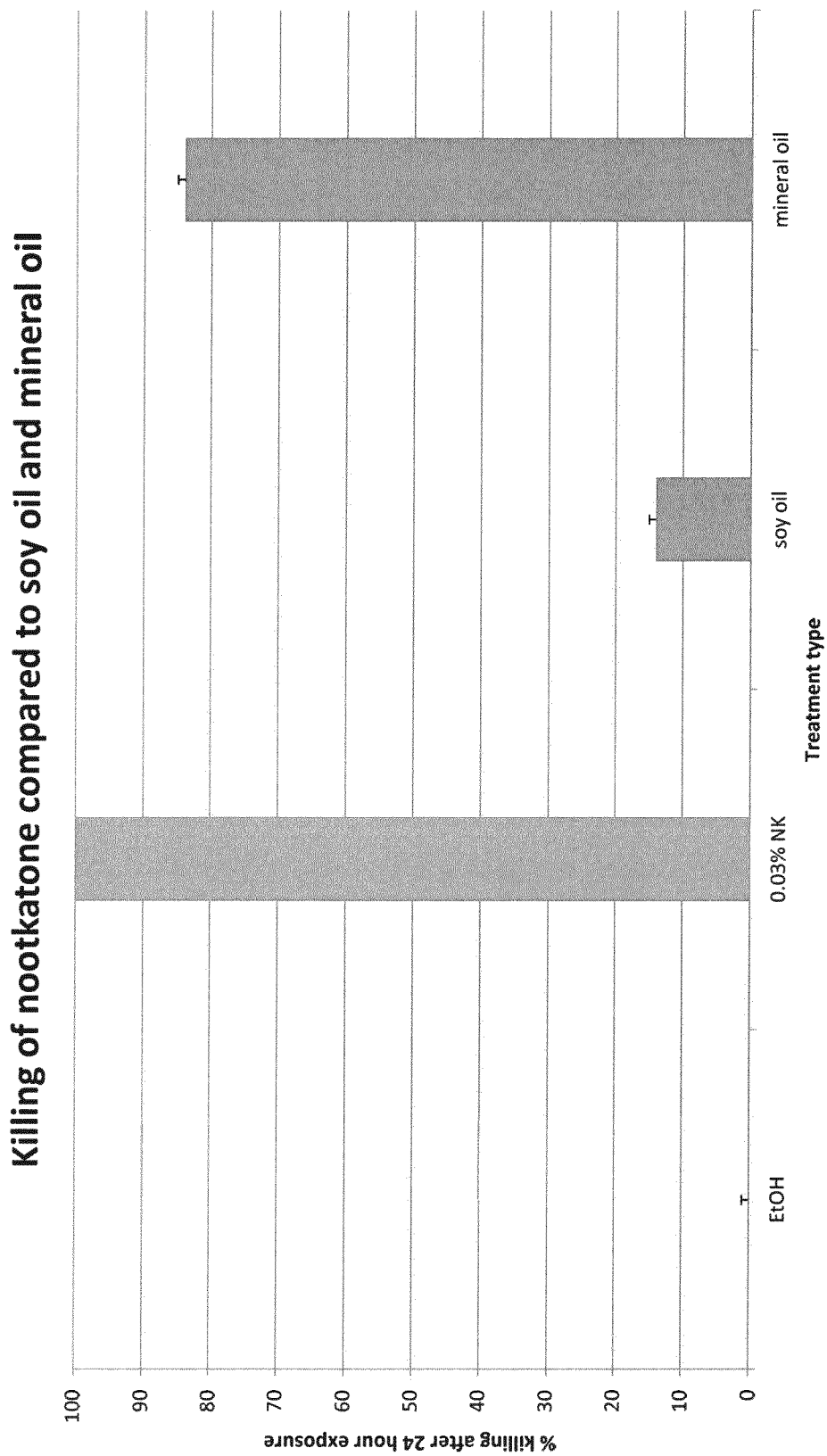
FIG. 3 shows the results of a comparison of 0.03% nootkatone versus soy oil and mineral oil for effectiveness of killing *Aedes aegypti* larvae. A 0.03% nootkatone (v/v) concentration was more effective than either soy oil or mineral oil after 24 hr treatment. Ethanol-treated larvae were unaffected.

The results are shown in FIG. 3. As in previous experiments, addition of 0.03% nootkatone killed 100% of larvae in less than 24 hours, and the larvae were unaffected by an ethanol-only treatment. Mineral oil was somewhat effective, killing an average of 84% of larvae in 24 hours. Soy oil was not effective as a larvicide, as only 14% of larvae were killed in 24 hours. These test results indicate that soy oil and mineral oil caused lower mortality rates and slower mortality than replicates of larvae that were treated with the same concentration (0.03% v/v) of nootkatone. Therefore, the data demonstrate that nootkatone is unique in the rapidity and efficacy of its killing of larvae compared to the other tested oils. Moreover, these data show that nootkatone is a better option than oils, such as mineral oil, that cannot be used, for example, in drinking water, and that degrade slowly in the environment.

Example No. 3: Determining the Effect of Surface Area on the Efficacy of Nootkatone Compositions for Larvicide Activity In this example, concentration titration was performed to determine effective concentrations of nootkatone in nootkatone-containing protective compositions that maintain larvicidal activity, and to determine the effect of surface area on larvicidal activity of nootkatone-containing compositions.

Treatment

One milliliter of a solution of nootkatone in ethanol was applied directly to 200 milliliters of water containing larvae, using a micropipette. One treatment condition used 3% (v/v) nootkatone in ethanol, a second treatment condition used 1% (v/v) nootkatone in ethanol, and a third treatment used 0.5% (v/v) nootkatone in ethanol, for final concentrations of 30, 10, or 5 mg of nootkatone added per container. One milliliter of pure ethanol was used as a control. Three replicates of 25 larvae were tested per treatment in small- (250 mL flasks (23.8 cm$^2$ surface area) and medium-sized (600 mL beakers (54 cm$^2$ surface area)) containers, but only two replicates were made in large 1000 mL beakers (86.6 cm$^2$ surface area).

Containers were lightly covered with paper towels. Indicated surface areas were calculated based on the inside diameter of the container at the surface level when 200 mL water was added to the container.

Assessments

Larvae were observed after 24 hours post-introduction to the test containers. The larvae were scored according to the following criteria:

Morbidity (M): does not swim to/from the water surface to feed and breathe or otherwise initiate directional movement, but still exhibits movement with or without tactile stimulation; or Dead (mortality): exhibits no movement, even with tactile stimulation.

Readings were discontinued if treated mortality reached 100%, or control mortality exceeded 20%.

Results

Figure 4:
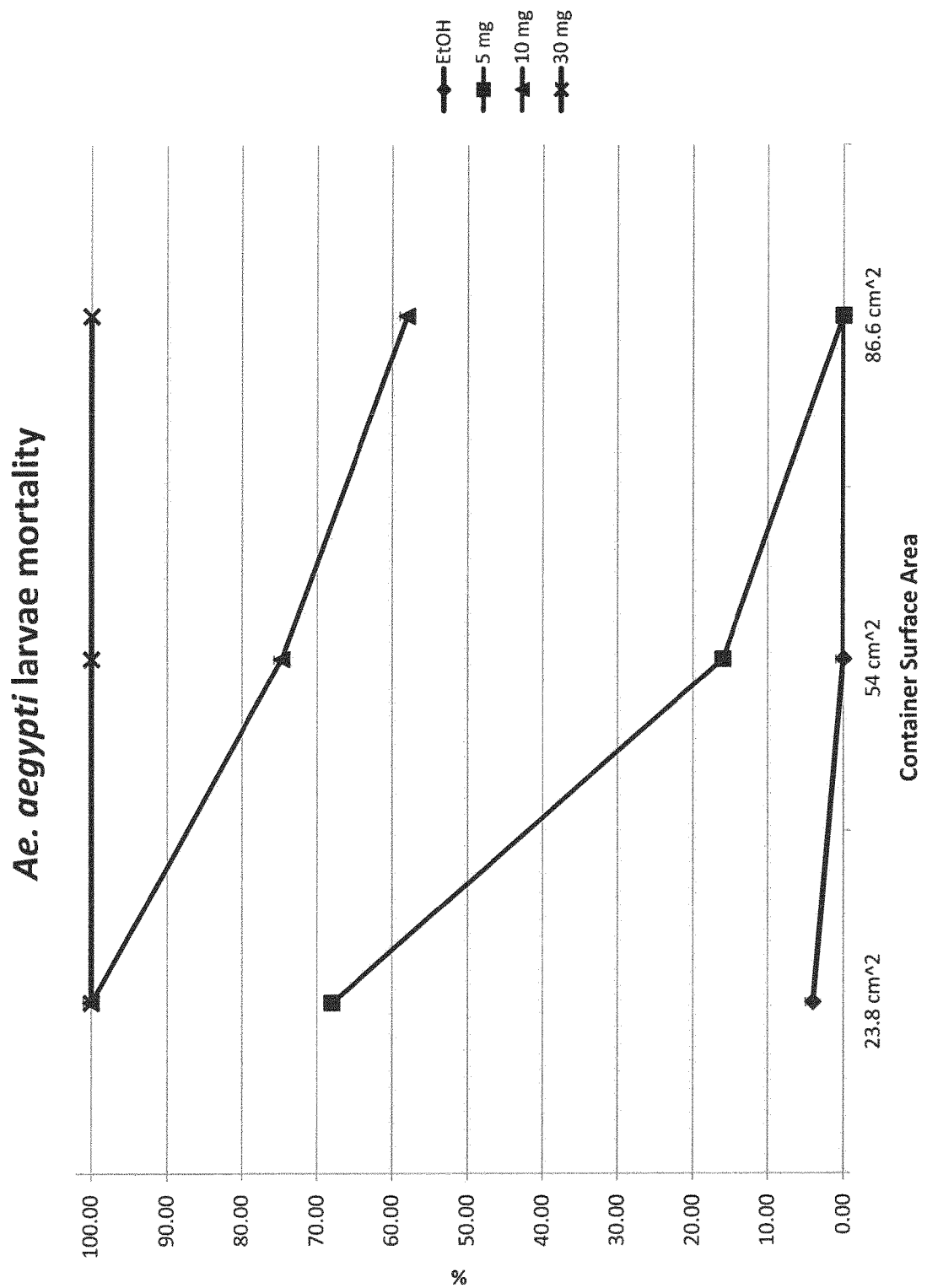
FIG. 4 shows the results of an experiment examining the effect of surface area on the efficacy of nootkatone compositions for larvicide activity. A correlation between nootkatone concentration and treatment surface area (i.e., air-liquid interface) was observed. As surface area increased, the effectiveness of nootkatone at lower concentrations diminished. However, increasing nootkatone concentrations restored the treatment effect against mosquito larvae to overcome the effect of increased surface area. Ethanol had marginal effect on larvae regardless of surface area size.

The surface concentrations tested were 5 mg/23.8 cm$^2$ (about 0.2 mg/cm$^2$), 10 mg/23.8 cm$^2$ (about 0.42 mg/cm$^2$), 30 mg/23.8 cm$^2$ (about 1.3 mg/cm$^2$), 5 mg/54 cm$^2$ (about 0.09 mg/cm$^2$), 10 mg/54 cm$^2$ (about 0.19 mg/cm$^2$), 30 mg/54 cm$^2$ (about 0.56 mg/cm$^2$), 5 mg/86.6 cm$^2$ (about 0.06 mg/cm$^2$), 10 mg/86.6 cm$^2$ (about 0.12 mg/cm$^2$), and 30 mg/86.6 cm$^2$ (about 0.35 mg/cm$^2$). The results are shown in FIG. 4. A few larvae died in the 250 mL control flasks, perhaps due to the stress of being in a deeper water column, but these control deaths averaged only 4% of the larvae in the control flasks. The presence of 30 mg of nootkatone was sufficient to kill all larvae in 24 hours, no matter which container size was used. Ten milligrams of nootkatone killed all larvae in the flasks with the smallest surface area (at a concentration of about 0.42 mg/cm$^2$), but the mortality rate decreased as surface area increased, even though total volume, and therefore volumetric concentration of nootkatone, was held constant. The same effect was even more pronounced when only 5 mg of nootkatone was introduced into each container, as larval mortality dropped from 68% in the flasks to only 16% in the medium sized containers. This lowest concentration of nootkatone did not kill in the largest containers (i.e., those with the largest surface area), even though the volumetric concentration of nootkatone, was the same in all cases. Therefore, at a surface concentration of at least about 0.09 mg/cm$^2$ nootkatone exhibits larvicidal properties. It is believed that this surface concentration would be equally effective on water and a solid surface. It is further contemplated that even lower surface concentrations of nootkatone can affect larvae development to hinder progression of the larvae to adulthood.

Example No. 4: Determining Duration of Protection from Larvae by Nootkatone-Containing Compositions In this example, nootkatone-containing larvicide compositions were formulated to maximize duration of protection by at least one of killing, immobilizing, or repelling larvae.

Method 1: Clean, glass 600 mL beakers were set up as test containers (such that the surface area of water to be treated was 54 cm$^2$), and were treated with 1 mL of 3% nootkatone in ethanol (v/v), or 1 mL of ethanol alone, as in Example No. 1, to achieve a final concentration of 0.03% nootkatone (v/v). After 24 hours, 100% of larvae were dead in the treated beakers, but 100% were alive in the control beakers, as in Example No. 1. An additional cohort of 25 larvae was added to each treatment beaker in the smallest practical volume of additional water, estimated at 1 mL per beaker. After an additional 24 hours, total live and dead larvae were counted and recorded. Testing continued by addition of new larval cohorts (25 per beaker, per day) for additional 24 hour periods until either there were no available 3rd/4th instar larvae, or until the rate of larval killing decreased.

Figure 5:
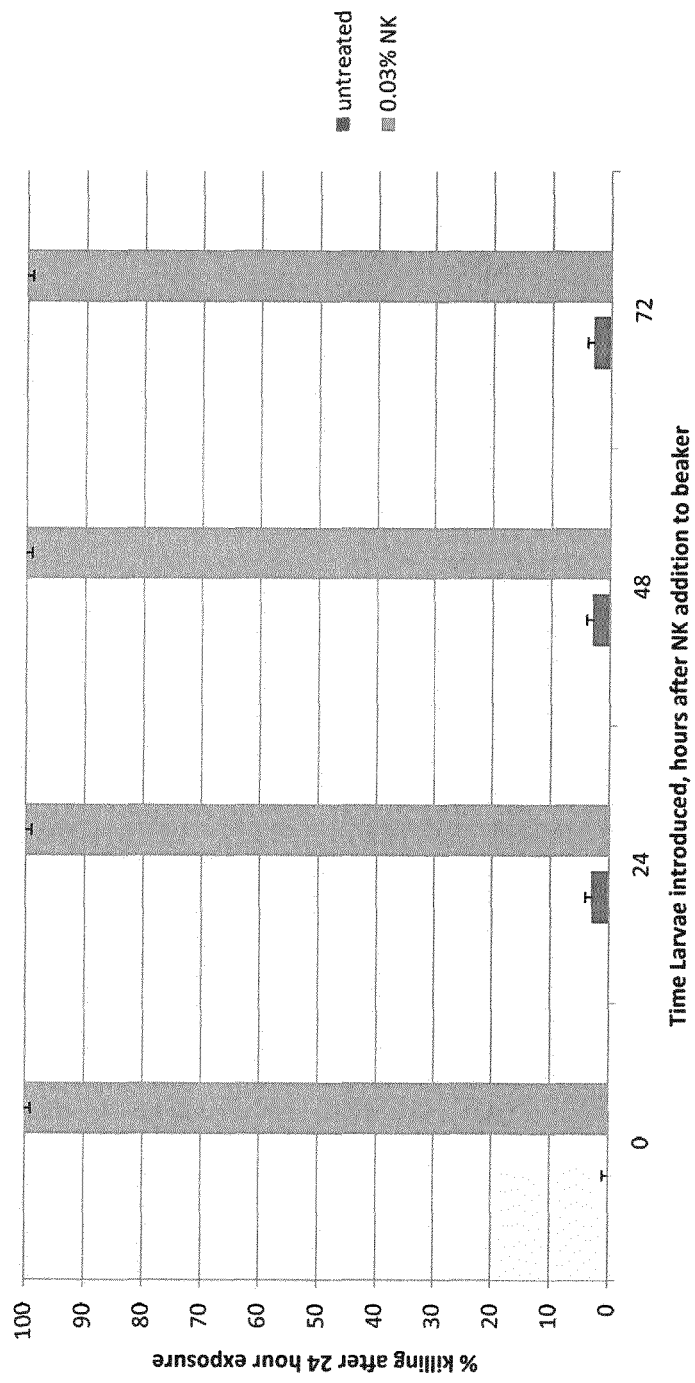
FIG. 5 shows that nootkatone is an effective larvicide over an extended period of time. Larvae added 0, 24, 48, and 78 hours after application of a 0.03% nootkatone (v/v) concentration all experienced 100% mortality. Ethanol-treated controls showed marginal differences in mortality over 72 hours.
Figure 6:
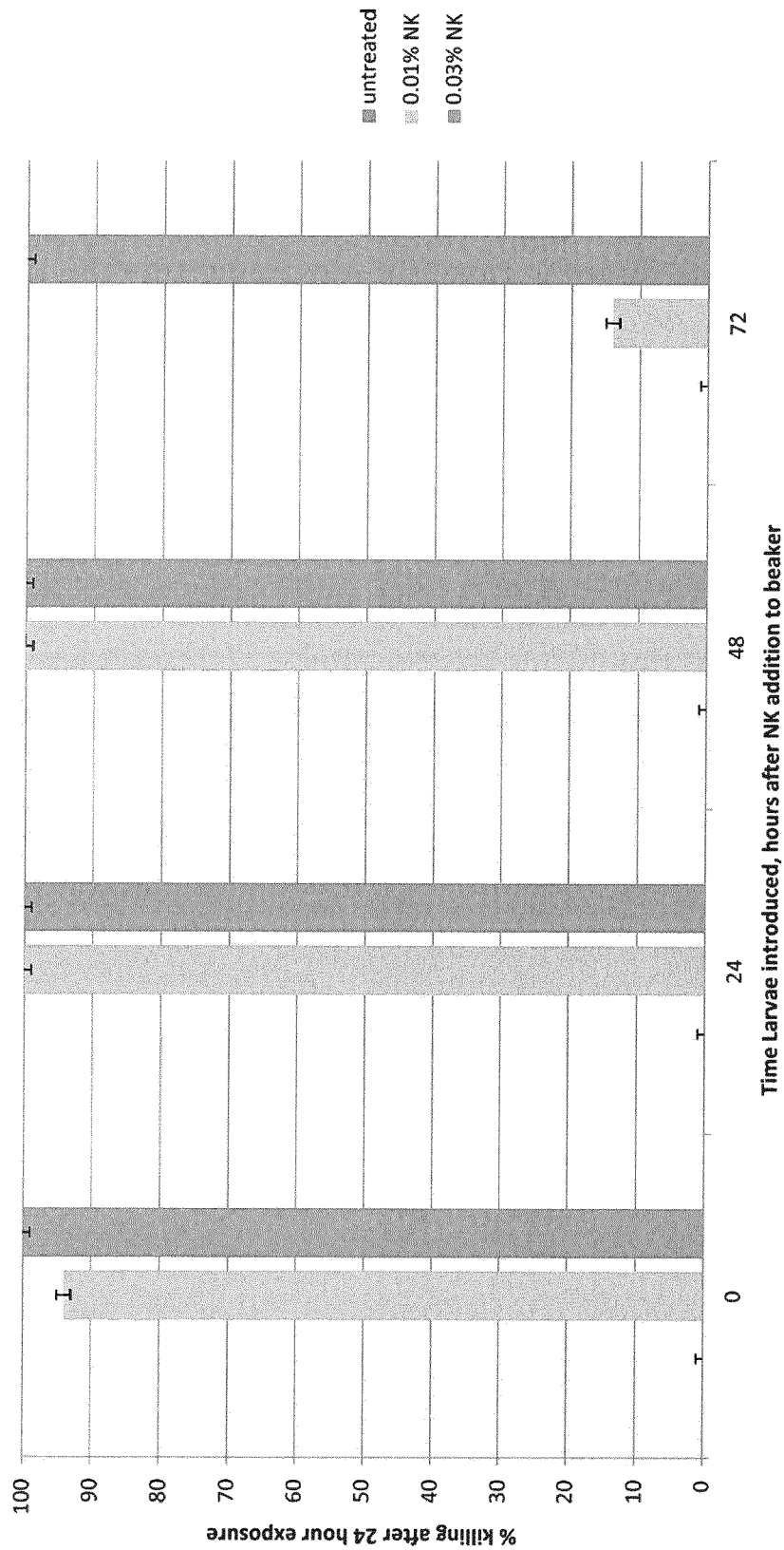
FIG. 6, similar to FIG. 5, shows that nootkatone is an effective larvicide over an extended period of time. Larvae added 0, 24, 48, and 78 hours after application of a 0.01% or 0.03% nootkatone (v/v) concentration all experienced 100% mortality through 48 hours. While the 0.03% nootkatone composition showed 100% mortality through 72 hours, the mortality rate of the 0.01% nootkatone composition fell to about 10%. Ethanol-treated controls showed marginal differences in mortality over 72 hours.

In two replicate experiments, larvae cohorts were added to test containers in the presence of 0.03% nootkatone, 1% ethanol, starting 24 to 72 hours after addition of nootkatone and ethanol to the test containers (see FIGS. 5 and 6). In the second experiment, additional additional larval replicates were added simultaneously to test containers in the presence of 0.01% nootkatone, 1% ethanol (see FIG. 6).

Figure 7:
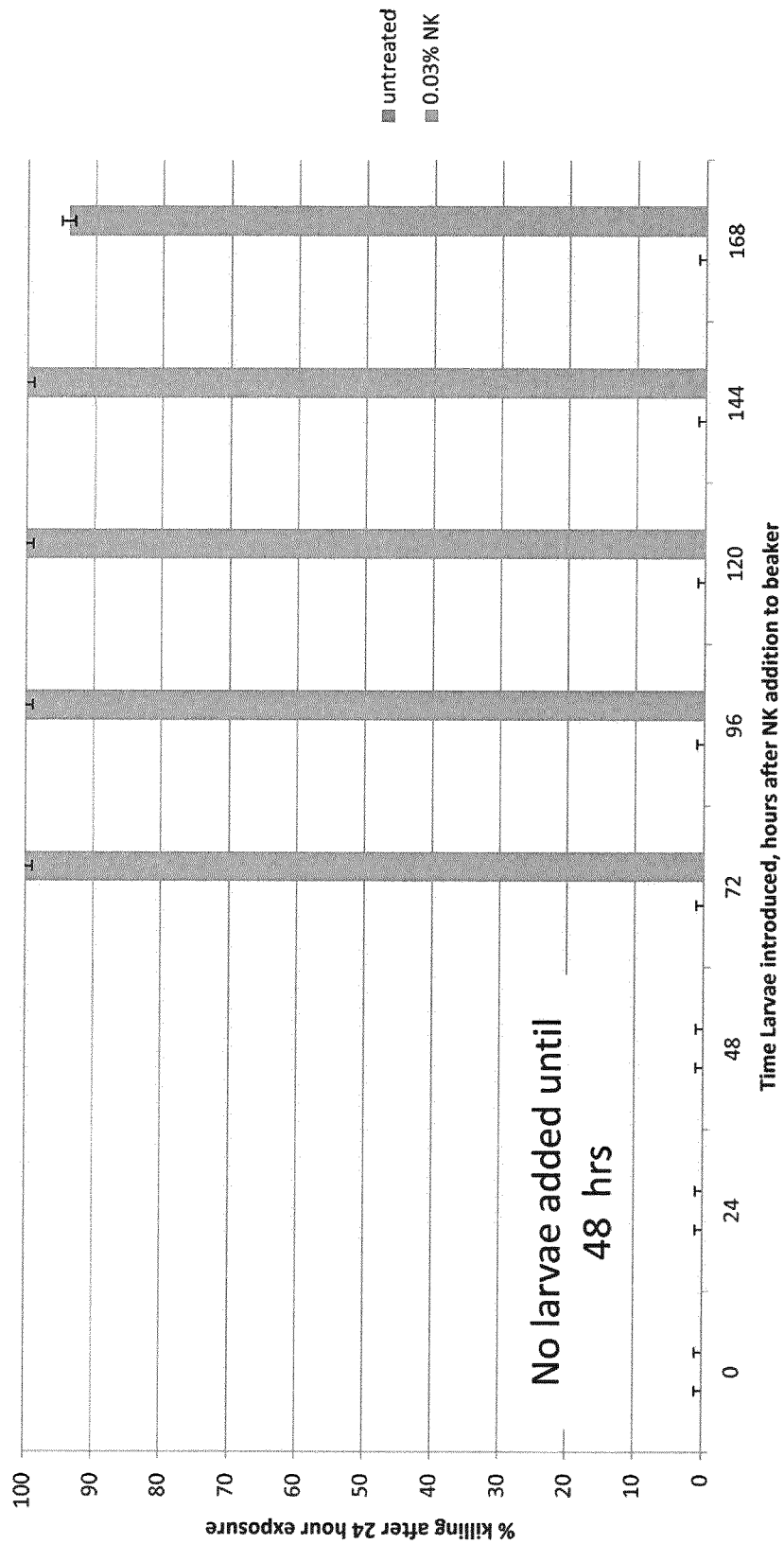
FIG. 7 further illustrates the effectiveness of nootkatone in killing larvae over an extended period of time, as shown in FIGS. 5 and 6. Here, a 0.03% nootkatone (v/v) concentration maintained greater than 90% mortality rates through one week of treatment.

In a separate experiment with the same experimental set-up, test containers were inoculated with nootkatone in ethanol 48 hours prior to addition of larvae (see FIG. 7). In these experiments, 100% of larvae were killed within 24 hours up to a week after nootkatone treatment. One week after addition of nootkatone, larval mortality was still at 94%.

Method 2: Clean, glass 600 mL beakers were set up as test containers (such that the surface area of water to be treated was 54 cm$^2$), and were treated with 1 mL of 1% or 3% nootkatone in ethanol (v/v), or 1 mL of ethanol alone, to achieve a final concentration of 0.01% or 0.03% nootkatone (v/v), respectively. Beakers were lightly covered with Kimwipes to prevent contamination, and to reduce evaporation. Beakers treated with 1 mL of 100% ethanol were used as controls. Four cohorts of 25 3rd and 4th instar larvae were added to individual beakers per day, 3-14 days after treatment with nootkatone, and mortality of larvae was recorded 24 and 48 hours after addition of larvae to beakers.

Results

Figure 8:
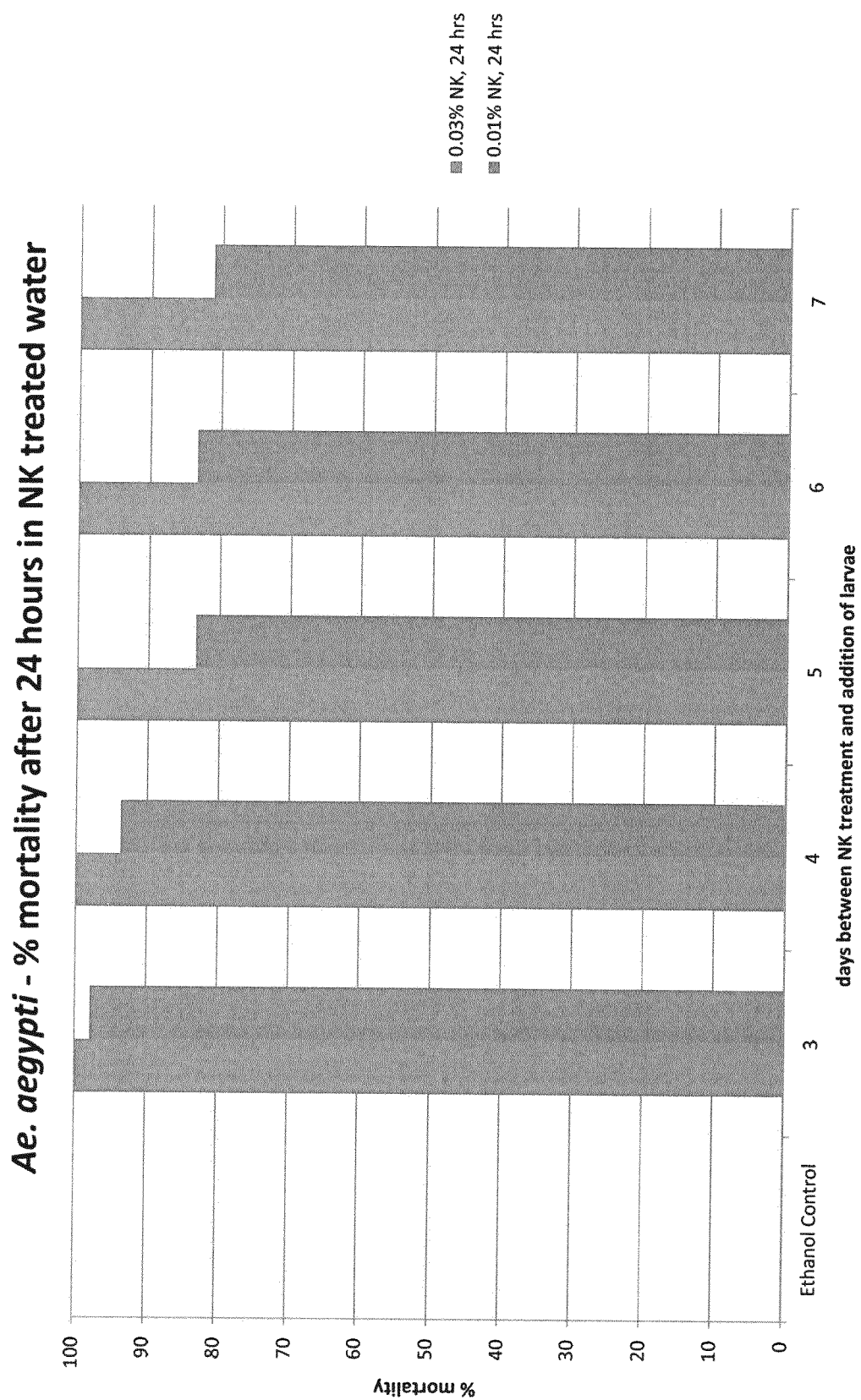
FIG. 8 further illustrates the effectiveness of nootkatone in killing larvae over an extended period of time. Here, larvae exposed to a 0.03% nootkatone (v/v) solution for twenty four hours exhibited 100% mortality rates through one week of treatment. Similarly, twenty-four hours of exposure to 0.01% nootkatone (v/v) produced over 80% larvae mortality rates through one week of treatment.
Figure 9:
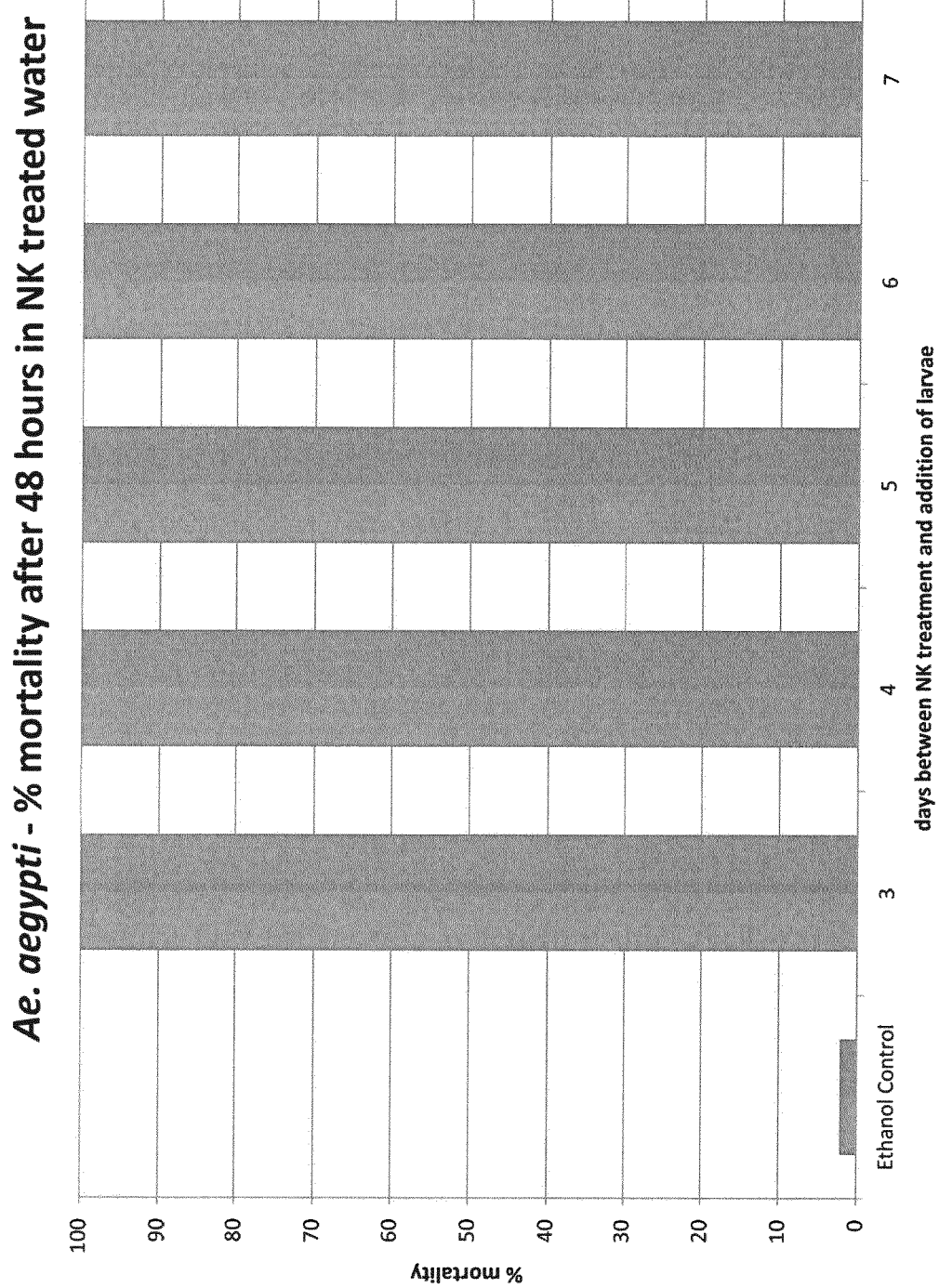
FIG. 9 further illustrates the effectiveness of nootkatone in killing larvae over an extended period of time. Here, fortyeight hours of exposure to 0.03% nootkatone or 0.01% nootkatone (v/v) produced 100% larvae mortality rates through one week of treatment.

For the experimental data shown in FIGS. 5-7, the method used included addition and removal of water, and potentially, removal of nootkatone, on each succeeding day. In a new experiment, individual beakers were set up in advance, so that all beakers were used one and only one time to test the longevity of nootkatone, with the only possible loss due to evaporation. The results shown in FIG. 8 demonstrate that a concentration of 0.03% nootkatone killed 100% of larvae within 24 hours when larvae were added to treated water 3-7 days after the water was treated. Treatment with 0.01% nootkatone resulted in a lower level of killing at 24 hours, and killing at 24 hours in the presence of 0.01% nootkatone gradually decreased from 98% 3 days after water treatment to 81% killing 7 days after water treatment. However, when the same beakers were scored 48 hours after addition of larvae (FIG. 9), the 0.01% nootkatone treatment resulted in 100% larval mortality for 3-7 days after water treatment.

Figure 10:
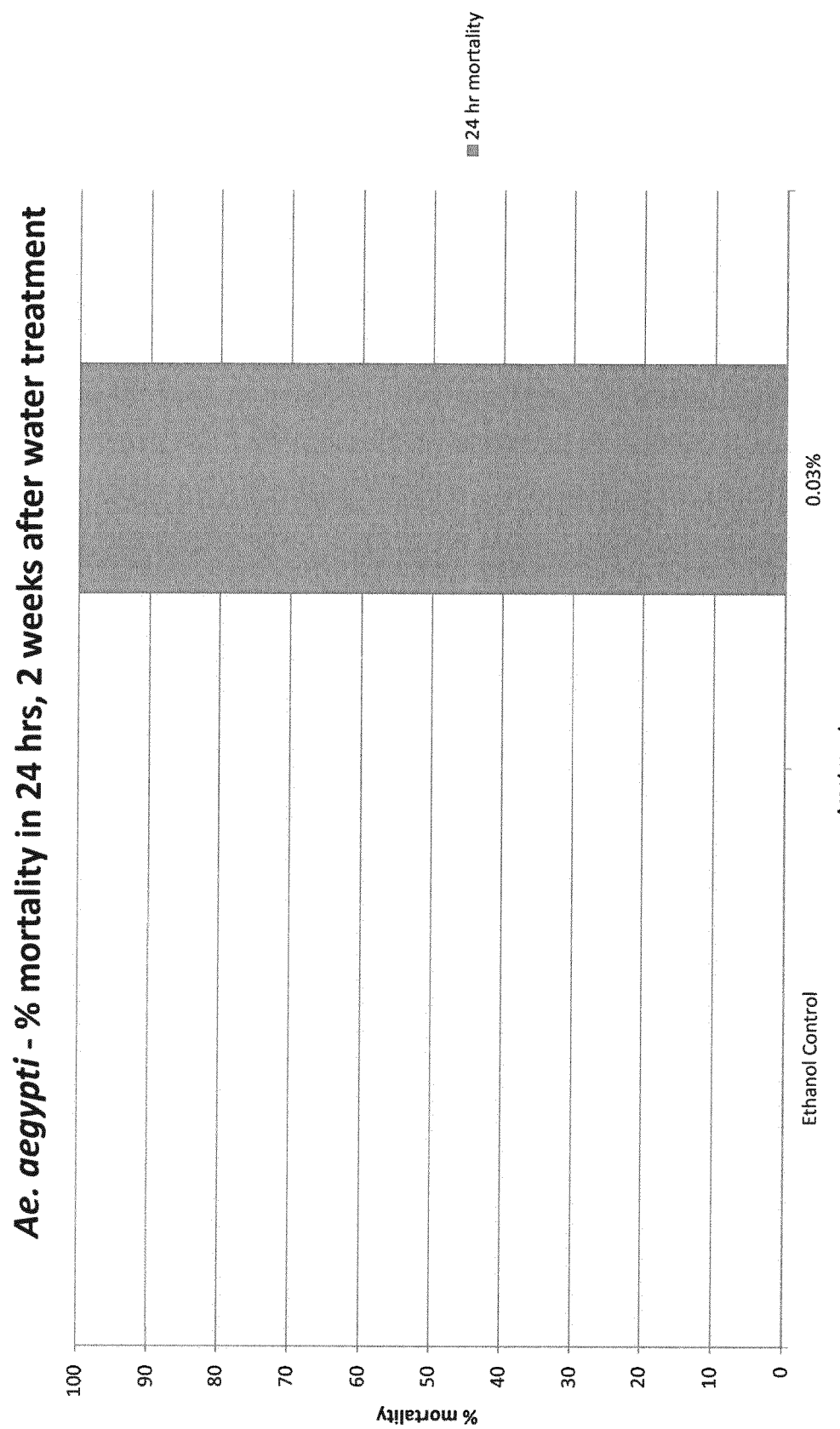
FIG. 10 further illustrates the effectiveness of nootkatone in killing larvae over an extended period of time. Here, a 0.03% nootkatone (v/v) concentration maintained a 100% mortality rate upon 24 hour exposure of larvae two weeks after water treatment.

In a separate experiment using the same setup, nootkatone-treated beakers were held for two weeks prior to addition of larvae. Due to the extended time delay, more than 50% of the original liquid volume had evaporated. To avoid having a potentially higher concentration of nootkatone than the desired 0.03%, sterile water was added to bring the total volume back to 100 mL before larval cohorts were added. As shown in FIG. 10, 100% of the larvae were killed within 24 hours, demonstrating a nootkatone killing duration of at least two weeks at the 0.03% concentration.

Example No. 5: Prevention of Mosquito Egg Hatching

In this example, nootkatone-containing compositions were formulated to prevent hatching of mosquito eggs.

Egg Preparation.

Mosquito eggs from *Aedes aegypti* and *Anopheles quadrimaculatus* mosquitoes were obtained from a commercial source.

Egg Hatching Experiments.

In a first experiment, *Anopheles quadrimaculatus* eggs were divided into cohorts of ~500 eggs. Each cohort was placed inside a clean 100 mL glass beaker after receiving mock treatment or a true treatment with nootkatone (see "Treatments"), after which the beaker was covered with paper and held at 30-35° C. to allow hatching. Hatching was scored as the number of live larvae after 24-48 hours.

In a second experiment, *Aedes aegypti* eggs were divided into cohorts of ~100 eggs. Each cohort was placed inside a clean 9 cm Petri dish after receiving mock treatment or a true treatment with nootkatone (see "Treatments"), after which the Petri dish was covered with its lid and held at 30-35° C. to allow hatching. Hatching was scored as the number of live larvae after 24 hours. Four cohorts were tested per treatment.

Treatments.

An aliquot of 0.2 mL of a 3% solution (w/v) of nootkatone in 100% ethanol was added to 20 mL of sterile MilliQ water in treatment Petri dishes to obtain a final concentration of 0.03% nootkatone/1% ethanol. Control beakers received 0.2 mL of 100% ethanol, to obtain a final concentration of 1% ethanol.

Results

Figure 11:
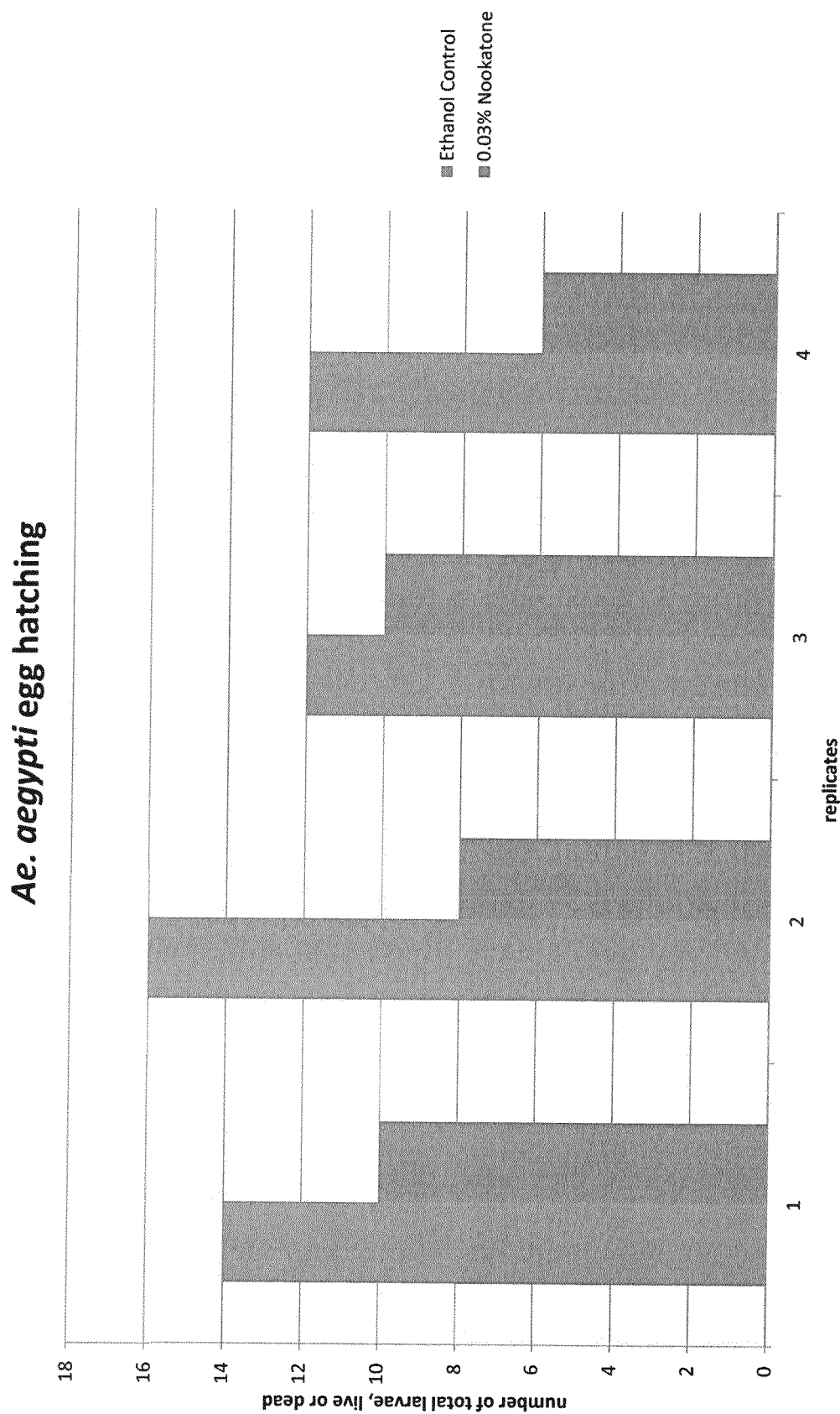
FIG. 11 shows the number of total number of *Ae. aegypti* mosquito eggs that hatched when treated with nootkatone compared to control.

The rate of egg hatching was calculated for each treatment and control egg cohort, and the results of at least 4 cohorts were averaged, and used to calculate the relative hatch rate for treatments versus controls (see FIG. 11). The four control replicates shown in FIG. 11 had an average of 13.5 larvae, all alive. The four Petri dishes that were treated with 0.03% nootkatone had an average of on 8.5 hatched larvae. This represents a 37% reduction in egg hatching versus the controls, and all larvae in the treated dishes were dead. These results demonstrate that treatment of mosquito breeding sites will effectively reduce the number of mosquito eggs that hatch into larvae. These results also demonstrate that those larvae that do hatch will be killed, consistent with previous results. Therefore, nootkatone treatment of mosquito breeding sites will effectively reduce mosquito populations by preventing hatching and killing hatched larvae.

Example No. 6: Efficacy of Nootkatone Compositions Against Mosquito Pupae

In this example, nootkatone-containing compositions were formulated to kill mosquito pupae.

Pupae Preparation.

Eggs of *Aedes aegypti* were purchased from a commercial supplier. Eggs were hatched in sterile MilliQ water and fed with finely ground Tetramin® fish food until they developed into pupae.

Pupae Experiments.

Clean, glass 600 mL beakers were washed and thoroughly rinsed prior to use as test containers. On testing days, pupae were removed from dishes used to grow larvae. Replicates of 10 pupae each were randomly assigned to glass beakers in a volume of 100 mL of sterile MilliQ water, and a treatment of nootkatone (see "Treatments" below), or a control treatment of ethanol alone, was added. Three control replicates and 4 treated replicates were tested on one day, and on a second day, two control replicates and four treated replicates were tested. The beakers were then covered lightly with Kimwipes, secured by rubber bands to prevent escape of adults. The beakers were observed after 24 hours, and the numbers of live pupae, dead pupae, live adults, and dead adults were recorded.

Treatments.

An aliquot of 1 mL of a 3% solution (w/v) of nootkatone in 100% ethanol was added to treatment beakers to obtain a final concentration of 0.03% nootkatone/1% ethanol. Control beakers received 1 mL of 100% ethanol, to obtain a final concentration of 1% ethanol.

Results

Figure 12:
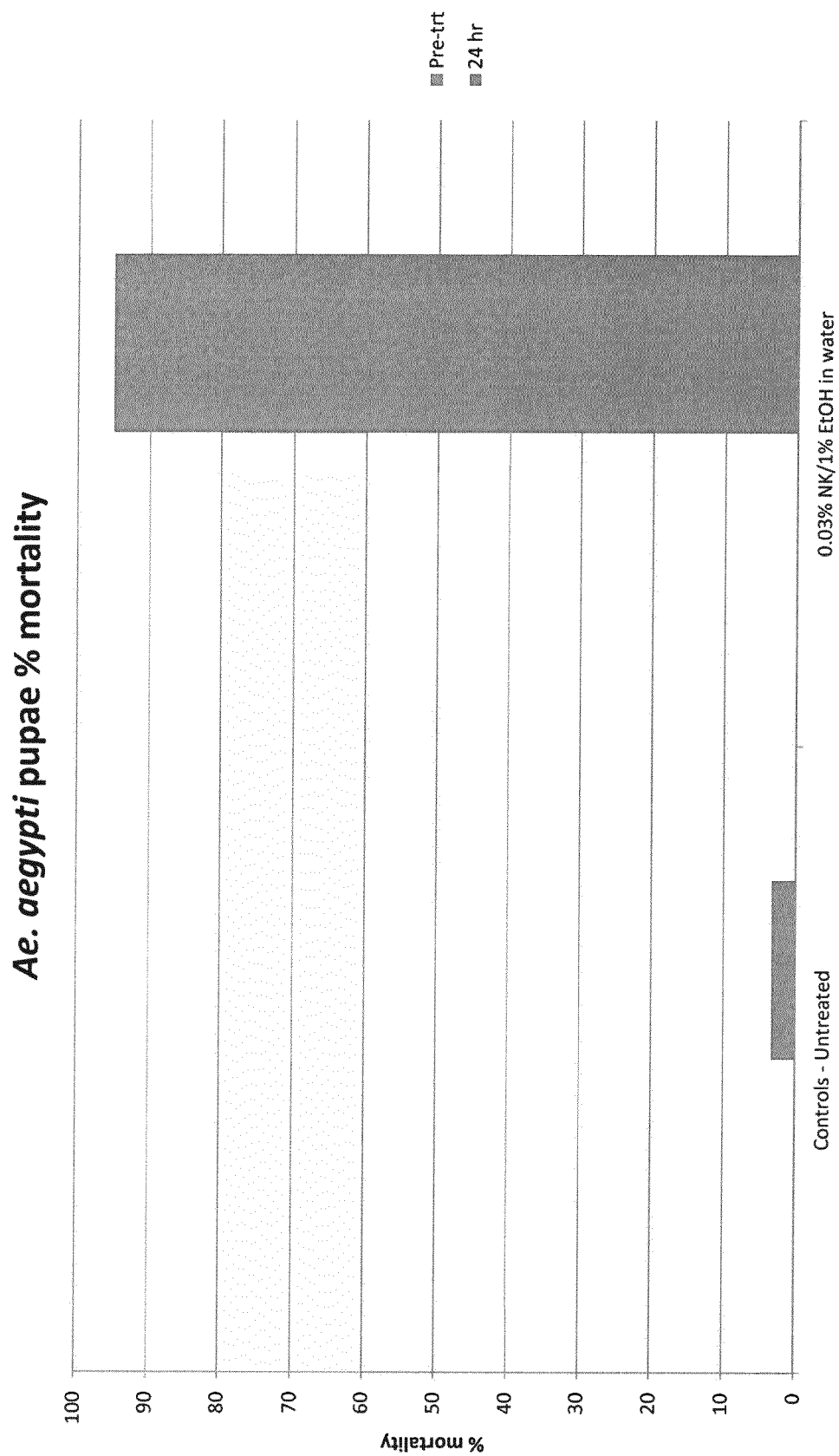
FIG. 12 shows the average number of *Ae. aegypti* mosquito pupae killed after 24 hr treatment with 0.03% nootkatone/1% ethanol in water compared to a 1% ethanol in water control.
Figure 13B:
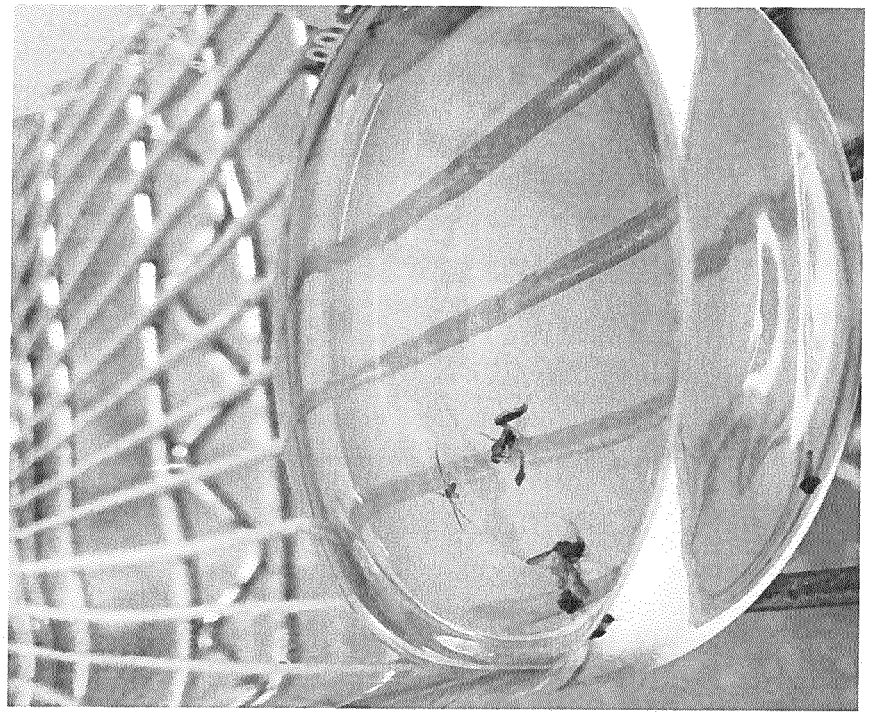
FIG. 13B is a photograph of pupae and eclosed adult mosquitoes treated with 0.015% nootkatone and 0.5% ethanol. Pupae that attempted to eclose either perished in the attempt, or the eclosed adult mosquitoes died on the water's surface.
Figure 13A:
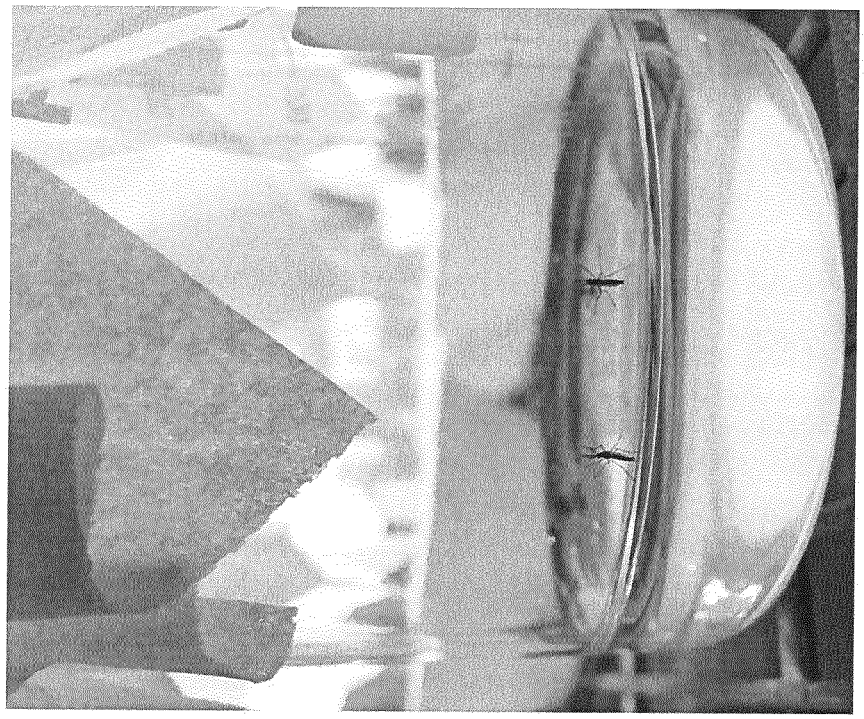
FIG. 13A is a photograph of live adult mosquitoes on the surface of the test beaker, and two live adults standing on the water surface, which contained 0.5% ethanol.

As seen in FIG. 12, an average of 94% of pupae treated within nootkatone died within 24 hours (93% in one experiment, 95% on a second day of testing) compared to 3% of control pupae, which demonstrates significant effectiveness of nootkatone for killing pupae.

Example No. 7: Prevention of Adult Emergence from Pupae

In this example, nootkatone-containing compositions were formulated to kill pupae or prevent adult mosquito eclosion.

Pupae Preparation.

Eggs of *Aedes aegypti* were purchased from a commercial supplier. They were hatched in sterile MilliQ water and fed with finely ground Tetramin® fish food until they developed into pupae.

Pupae Experiments.

Clean, glass 600 mL beakers were washed and thoroughly rinsed prior to use as test containers. On each of four testing days, pupae were removed from dishes used to grow larvae. Replicates of 10 pupae each were randomly assigned to glass beakers in a volume of 100 mL of sterile MilliQ water, and a treatment of nootkatone (see "Treatments" below), or a control treatment of ethanol alone, was added. The beakers were then covered lightly with Kimwipes, secured by rubber bands to prevent escape of adults. The beakers were observed after 24 hours, and the number of live pupae, dead pupae, live adults, and dead adults were recorded.

Treatments.

An aliquot of 0.5 mL of a 3% solution (w/v) of nootkatone in 100% ethanol was added to treatment beakers to obtain a final concentration of 0.015% nootkatone/0.5% ethanol. Control beakers received 0.5 mL of 100% ethanol, to obtain a final concentration of 0.5% ethanol.

Results

Figure 14A:
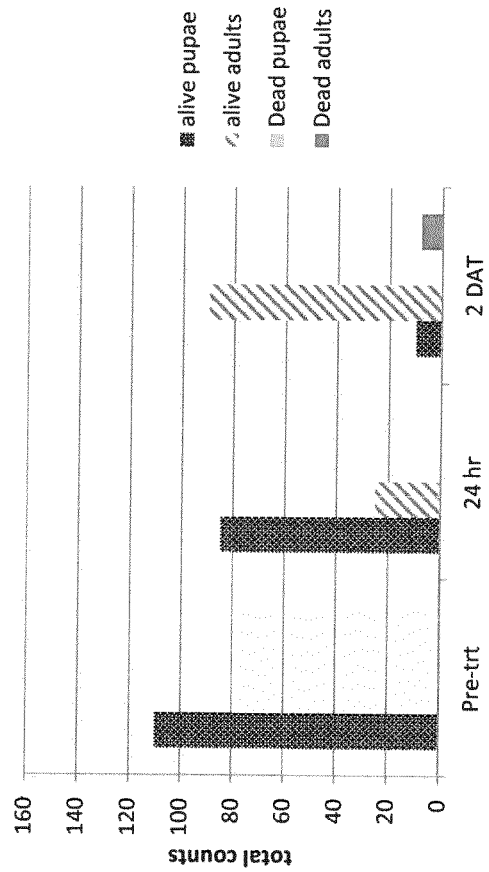
FIG. 14A shows the total number of live pupae, dead pupae, live eclosed adults, and dead eclosed adults pretreatment, after 24 hours, and after 48 hours of treatment with a control composition of 0.5% ethanol in water.
Figure 14B:
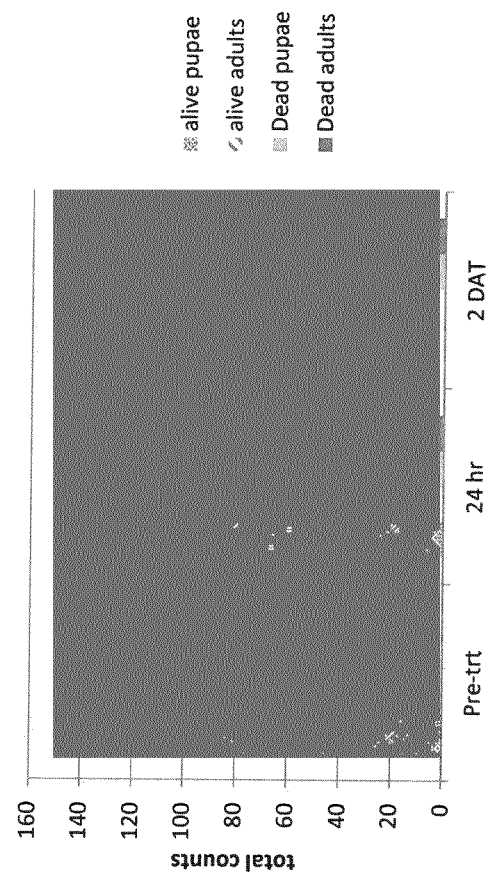
FIG. 14B shows the total number of live pupae, dead pupae, live eclosed adults, and dead eclosed adults pretreatment, after 24 hours, and after 48 hours of treatment with a treatment composition of 0.015% nootkatone and 0.5% ethanol in water.

As seen in Table No. 4 below, which shows number of pupae and adults pretreatment (Pre-trt), 24 hours, and 48 hours (2 DAT) after treatment, pupae contained in control beakers containing 0.5% ethanol in water gradually eclosed over 48 hours. After 48 hours, 81.8% of the pupae had become adults that were either flying or resting on the surface of the water or portions of the interior of the beakers, as shown in FIG. 14A. In contrast, when pupae were introduced into beakers containing 0.015% nootkatone/0.5% ethanol (v/v) in water, after 48 hours, there were no survivors. Of the 150 pupae tested, 103 (68.7%) died as pupae. The remaining 47 (31.3%) metamorphosed, but died during the process of eclosing and never left the water surface, as seen in FIG. 14B.

TABLE NO. 4

Effects of Nootkatone Treatment on
Mosquito Pupae and Eclosed Adults.

|  | Controls - 0.5% EtOH in water | | | 0.015% NK/0.5% EtOH in water | | |
| --- | --- | --- | --- | --- | --- | --- |
|  | Pre-trt | 24 hr | 2 DAT | Pre-trt | 24 hr | 2 DAT |
| live pupae | 110 | 85 | 10 | 150 | 88 | 0 |
| live adults | 0 | 25 | 90 | 0 | 0 | 0 |
| Dead pupae | 0 | 0 | 2 | 0 | 31 | 103 |
| Dead adults | 0 | 0 | 8 | 0 | 31 | 47 |

Example No. 8: Prevention of Adult Mosquito Egg Laying on Treated Mosquito Breeding Sites In this example, nootkatone-containing compositions were formulated to prevent adult female mosquitoes from landing on a breeding site to lay eggs.

Mosquito Preparation.

Adult *Aedes aegypti* mosquitoes from a laboratory were blood fed and mated. Testing was conducted 2 days after administration of the blood meal to ensure that females were ready to oviposit.

Treatments.

White filter paper was cut to fit Petri dishes 9 cm in diameter, and each paper was treated with 1 mL of ethanol, 1% nootkatone, Formulation ECS-F-#605, or Formulation ECS-F_#607 (see Table No. 5). The filter papers were allowed to dry completely, and two Petri dishes were added to each cage of 100 blood fed mosquitoes, one treated, and one untreated control. A few milliliters of water was added to each Petri dish to provide a suitable egg laying site. Filter papers were observed at 24 hours and 48 hours after introduction of the mated, fed mosquitoes to the cages. Each treatment was tested in triplicate.

TABLE NO. 5

Treatment Formulations

| Formulation #<br>Ingredients | ECS-F-605<br>% | ECS-F-607<br>% |
| --- | --- | --- |
| Nootkatone | 1.00% | — |
| Benzyl alcohol | 4.00% | 4.00% |
| IPM | 6.00% | 6.00% |
| IPA | 10.00% | 10.00% |
| Peneteck ® LT | 5.00% | 5.00% |
| BHT | 0.10% | 0.10% |
| Alkamuls ® EL620 | 10.00% | 10.00% |
| Paragon ® III | 0.20% | 0.20% |
| Water | 63.70% | 64.70% |

Results

Figure 15:
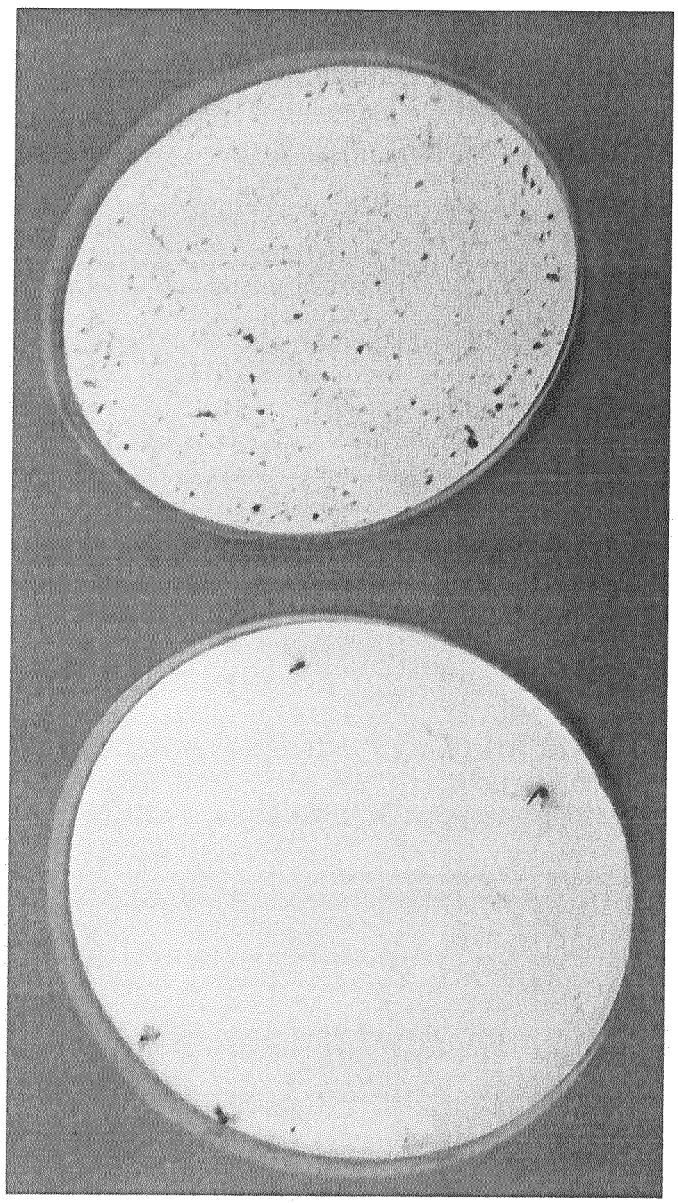
FIG. 15 shows mosquito fecundity on filter paper treated with 1% nootkatone (left) and ethanol only (right)

Female mosquitoes lay a high density of eggs (black spots) on suitable egg laying substrates, such as white filter paper. It was anticipated that either adult females would be repelled from egg laying sites that were treated with nootkatone, or that they would attempt to land and be poisoned by contacting nootkatone on the water surface. The rate of egg laying on the treated surface and the control surface, the presence of any adults found dead on the surface, and the overall mortality rate on a daily basis were recorded, and the average and standard error were calculated versus the untreated controls. As shown in Table No. 6, there was 11% variation in the number of eggs laid on the pairs of untreated filter papers in the control cages. An unexpected result was that filter papers treated with ethanol alone had 24% more eggs laid than the average of the untreated filter papers in the same cages. However, treatment using 1% nootkatone in ethanol resulted in a total of only 2 eggs laid on treated papers in 3 cages, versus 700-1100 eggs per cage on the untreated filter papers in the same cages, for a 99% reduction in fecundity. Treatment using Formulations ECS-F-#605 and ECS-F-#607 also resulted in greater than 99% reduction in fecundity versus untreated controls in the same cages. Photographs of representative filter papers are shown in FIG. 15, 1% nootkatone treatment (left), ethanol-only control (right).

TABLE NO. 6

Effects of Nootkatone Treatment
on Mosquito Egg Laying.
MOSQUITO FECUNDITY
Percent fecundity reduction

| Treatment | Average | Std. error |
| --- | --- | --- |
| Untreated | 11.5 | 6.1 |
| Ethanol | −24.2 | 37.3 |
| 1% NK | 99.9 | 0 |
| #605 | 99.7 | 0.1 |
| #607 | 99.1 | 0.8 |

The numbers of dead or otherwise affected adults found on the filter papers are shown in Table No. 7. The average number of affected mosquitoes after 2 days was similar in the untreated controls and the ethanol-treated samples, 5.3 versus 5.7 per cage, respectively. The average number of dead mosquitoes treated with 1% nootkatone, 10.7 per cage, shows a small effect on adult female mortality contrasted against the highly significant reduction in fecundity.

TABLE NO. 7

Effects of Nootkatone Treatment on Adult Mosquito Mortality
ADULT MOSQUITO MORTALITY

| Days post-exposure | Means | | | Standard Errors | | |
| --- | --- | --- | --- | --- | --- | --- |
|  | Knock-down | Dead | Affected | Knock-down | Dead | Affected |
|  | Untreated control | | | | | |
| 1 | 0.0 | 2.0 | 2.0 | 0.0 | 1.5 | 1.5 |
| 2 | 0.0 | 5.3 | 5.3 | 0.0 | 2.4 | 2.4 |
|  | Ethanol control | | | | | |
| 1 | 0.7 | 3.7 | 4.3 | 0.3 | 0.9 | 1.2 |
| 2 | 0.3 | 5.3 | 5.7 | 0.3 | 0.9 | 0.9 |
|  | 1% NK | | | | | |
| 1 | 0.0 | 6.7 | 6.7 | 0.0 | 2.2 | 2.2 |
| 2 | 0.0 | 10.7 | 10.7 | 0.0 | 1.7 | 1.7 |

These results indicate that nootkatone-containing compositions are effective for repelling mosquitoes from treated mosquito breeding sites and thus effectively prevent mosquito oviposition at treated sites. Furthermore, the elevated number of dead mosquitoes on the nootkatone-treated trials compared to negative controls, and the fact that the water with nootkatone treatment contained more dead adult mosquitoes than mosquito eggs, suggests that female mosquitoes who did attempt to oviposit in the nootkatone-treated water were poisoned.

Example No. 9: Nootkatone-Containing Compositions as Larvicides

In this example, nootkatone-containing compositions were evaluated for their ability to act as a larvicide by coating a water surface. Mixed sex 3rd and 4th instar *Aedes aegypti* larvae (Yellow fever mosquito) were tested.

Treatment 1.

98% pure nootkatone crystals were held at 38° C. until they liquefied. Previous testing has shown that 1 mL of a 3% solution of nootkatone dissolved in ethanol, when added to 100 mL of water containing mosquito larvae, kills 100% of larvae in less than 24 hours. This experiment tested whether an equivalent amount of liquefied nootkatone alone is able to kill larvae. Thirty one microliters of liquified nootkatone crystals were dripped onto the surface of 100 mL of water in a 600 mL clean, glass beaker containing 25 mixed sex 3rd and 4th instar *Aedes aegypti* larvae. Larvae were observed for morbidity and mortality for 24 hours.

Treatment 2.

Standard storage conditions for nootkatone crystals is 4° C., therefore, the ability of crystals to coat a water surface without first liquifying them was tested. 300 mg of 98% pure nootkatone crystals were weighed and gently dropped onto the surface of 100 mL of water in a 600 mL clean, glass beaker containing 25 mixed sex 3rd and 4th instar *Aedes aegypti* larvae. Larvae were observed for morbidity and mortality for 24 hours.

Treatment 3.

Standard storage conditions for nootkatone crystals is 4° C., therefore, the ability of crystals to coat a water surface without first liquifying them was tested. 30 mg of 98% pure nootkatone crystals was weighed and gently dropped onto the surface of 100 mL of water in a 600 mL clean, glass beaker containing 10 mixed sex 3rd and 4th instar *Aedes aegypti* larvae (3 replicates). Three control replicates of 10 larvae each were placed in identical beakers of 100 mL of water, but without nootkatone. All beakers were provided with finely ground fish food, and they were maintained at room temperature (~72° F.). Larvae were observed for morbidity and mortality until death.

Results

Treatment 1.

When dripped onto a calm water surface, the liquefied nootkatone spread out into a surface film instantaneously, but within a few minutes, it formed varying droplet sizes, leaving some regions of the surface covered. This process continued, as small droplets coalesced into fewer, larger ones, leaving increasing surface areas completely uncoated. FIGS. 16(a) and 16(b) show photographs of nootkatone droplets of varying sizes on the surface of water without larvae present. During observations, it was noted that larvae swimming at the water surface collided with small droplets of nootkatone. FIG. 16(c) shows a photo of dead larvae 24 hours after treatment. On the left side of the surface, a group of several larvae were trapped within a single droplet of liquid nootkatone (see arrow). The remaining dead larvae were located at the bottom of the beaker. As the water surface was not coated by nootkatone, and as larvae were observed twitching near the bottom of the beaker after exposure to nootkatone, death was likely due to a neurological effect, rather than suffocation or another mechanical effect.

Previous speculation that suggests that NK might kill by simple asphyxiation as larvae broke surface tension is not supported by these data. In fact, it is believed that the current data show that this previous speculation cannot be correct. The current observations strongly support the conclusion that NK must make contact to kill, thus compositions of NK that form solutions or emulsions, even those as simple as NK in alcohol (e.g., ethanol), are believed to be consistently more effective than liquid NK alone, due to its hydrophobicity, its very low solubility in water, and its tendency to clump.

Further, the kill rates for mosquito larvae were not as high as previous testing showing that 1 mL of a 3% solution of nootkatone dissolved in ethanol, when added to 100 mL of water containing mosquito larvae, kills 100% of larvae in less than 24 hours. It is therefore concluded that a significant advantage in kill rates can be achieved by solubilising nootkatone (such as in ethanol or a carrier and surfactant mixture) prior to addition to the water to be treated, such that the solubilised nootkatone is able to form a layer on the surface of the water. The alternative use of nootkatone alone only permits a toxic effect dependent on the concentration of nootkatone in the volume of water to be treated. Hence, for large volumes of water, the use of solubilised nootkatone (such as nootkatone dissolved in ethanol) is greatly preferred for a more uniform surface treatment capable of repelling or killing adult females wishing to oviposit, and/or for simultaneously killing mosquito larvae already present in the water being treated.

Treatment 2.

Figure 17C:
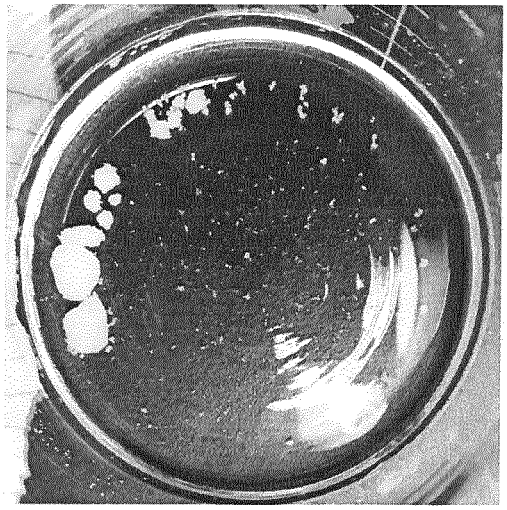
FIG. 17C shows crystallized nootkatone clumps on the water surface after 3 hours.
Figure 17A:
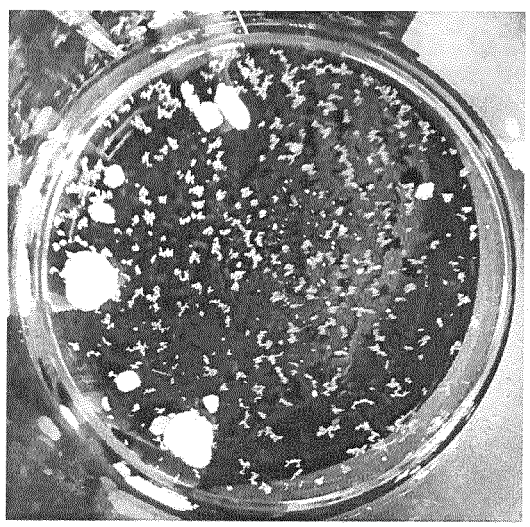
FIGS. 17A and 17B show crystallized nootkatone clumps at and below the water surface.
Figure 17B:
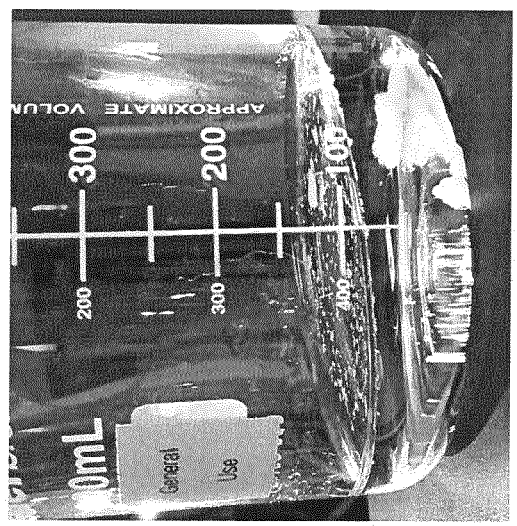

Nootkatone crystals formed clumps of varying sizes when dropped onto water. Clumps either floated or fell to the bottom, depending on the clump size, as can be seen in FIGS. 17A and 17B. The clumps remained after 3 hours, as can be seen in FIG. 17C. The surface crystals do not form a contiguous surface layer.

Treatment 3.

As for treatment 2, nootkatone crystals formed clumps of varying sizes when dropped onto water. Clumps either floated or fell to the bottom, depending on the clump size. When 30 mg of nootkatone was added as a solution in ethanol, 100% of larvae died within 24 hours, while larvae with added ethanol alone were unaffected (Table No. 3). Using crystalline nootkatone in this experiment, after 27 hours, 100% of control larvae were alive and swimming normally. 93% of larvae exposed to nootkatone crystals were alive at 27 hours, although only ~50% appeared to be unaffected. Complete results are provided in Table No. 8. The same concentration of nootkatone did affect all of the larvae, but killing was below 100% after more than 3 days, versus less than one day when used in solution.

TABLE NO. 8

Effects of Nootkatone Crystal Treatment on Mosquito Larvae.

| | Controls - in water | | | 30 mg NK in water | | |
|---|---|---|---|---|---|---|
| | Alive | KD | Dead | Alive | KD | Dead |
| Pre-trt | 100% | 0% | 0% | 100% | 0% | 0% |
| 1 hr | 100% | 0% | 0% | 100% | 0% | 0% |
| 27 hr | 100% | 0% | 0% | 53% | 40% | 7% |
| 54 hr | 100% | 0% | 0% | 3% | 27% | 70% |
| 77.5 hr | 100% | 0% | 0% | 0% | 3% | 97% |

Having described the invention in detail and by reference to specific aspects and/or embodiments thereof, it will be apparent that modifications and variations are possible without departing from the scope of the invention defined in the appended claims. More specifically, although some aspects of the present invention may be identified herein as particularly advantageous, it is contemplated that the present invention is not limited to these particular aspects of the invention. Percentages disclosed herein may vary in amount by ±10, 20, or 30% from values disclosed and remain within the scope of the contemplated invention.

What is claimed is:

1. A method of reducing a mosquito population, comprising:
    applying an effective amount of a nootkatone-containing composition to a mosquito breeding site,
    wherein the effective amount of the nootkatone-containing composition exposes members of each mosquito life cycle stage to a nootkatone concentration of about 0.01% to 0.03% (v/v) nootkatone at the mosquito breeding site, and
    wherein the effective amount of the nootkatone-containing composition kills members of each mosquito life cycle stage at the mosquito breeding site.

2. The method of claim 1, wherein the nootkatone-containing composition is applied about once per day, about once every 3 days, about once per week, about twice per week, about once per two weeks, about once per month, about once per two months, or about once per three months, or about once per season.

3. The method of claim 2, wherein the nootkatone-containing composition is applied using a dispenser, wherein the dispenser is a pouch, a puck, a pellet, a block, a granule, a vesicle, or a capsule.

4. The method of claim 3, wherein the dispenser is refillable.

5. The method of claim 1, wherein the mosquito population comprises a mosquito of the genera *Anopheles, Aedes, Culex,* or *Haemagogus*.

6. The method of claim 5, wherein the mosquito is *Aedes aegypti*.

7. The method of claim 1, wherein the nootkatone is wholly or partially solubilised, liquefied, and/or dispersed in the composition prior to being applied to a mosquito breeding site.

8. The method of claim 7, wherein the composition comprises ethanol, dichloromethane, ethyl acetate, hexane, an oil, a non-polar solvent, a surfactant, or a mixture or blend thereof.

9. The method of claim 7, wherein the composition comprises a non-toxic, biodegradable nootkatone-solubilizing carrier or surfactant or a mixture or blend thereof.

10. The method of claim 1, wherein the nootkatone-containing composition reduces the rate of mosquito egg hatching in the mosquito breeding site.

11. The method of claim 10, wherein the rate of mosquito egg hatching is reduced by at least about 30%.

12. The method of claim 1, wherein the members of each mosquito life cycle stage include eggs, larvae, pupae, and adult mosquitoes.

* * * * *